(12) United States Patent
Van Der Beek et al.

(10) Patent No.: US 11,596,167 B2
(45) Date of Patent: Mar. 7, 2023

(54) FORMULAS COMPRISING OPTIMISED AMINO ACID PROFILES

(71) Applicant: N.V. Nutricia, Zoetermeer (NL)

(72) Inventors: Eline Marleen Van Der Beek, Utrecht (NL); Marieke Abrahamse-Berkeveld, Utrecht (NL); Johannes Bernard Van Goudoever, Utrecht (NL)

(73) Assignee: N.V. Nutricia, Zoetermeer (NL)

( * ) Notice: Subject to any disclaimer, the term of this patent is extended or adjusted under 35 U.S.C. 154(b) by 0 days.

(21) Appl. No.: 15/312,530

(22) PCT Filed: May 19, 2014

(86) PCT No.: PCT/NL2014/050314
§ 371 (c)(1),
(2) Date: Nov. 18, 2016

(87) PCT Pub. No.: WO2015/178761
PCT Pub. Date: Nov. 26, 2015

(65) Prior Publication Data
US 2017/0086490 A1    Mar. 30, 2017

(51) Int. Cl.
*A23L 33/17*    (2016.01)
*A23L 33/19*    (2016.01)
(Continued)

(52) U.S. Cl.
CPC .............. *A23L 33/19* (2016.08); *A23L 33/17* (2016.08); *A23L 33/175* (2016.08);
(Continued)

(58) Field of Classification Search
CPC ........... A23C 9/20; A23C 9/203; A23C 9/206; A23L 33/40; A23L 33/19; A23L 33/17; A23L 33/175
See application file for complete search history.

(56) References Cited

U.S. PATENT DOCUMENTS 5,230,902 A * 7/1993 Gold .................. A61K 35/20
424/535
5,916,621 A    6/1999 Georgi et al.
(Continued)

FOREIGN PATENT DOCUMENTS

AU    771034 B2    3/2004
AU    2011100142 A4    3/2011
(Continued)

OTHER PUBLICATIONS

Snyderman et al., The Phenylalanine Requirement of the Normal Infant: Three Figures, The Journal of Nutrition, vol. 56, Issue 2, Jun. 1, 1955, pp. 253-263. (Year: 1955).*
(Continued)

*Primary Examiner* — Walter A Moore
(74) *Attorney, Agent, or Firm* — N.V. Nederlandsch Octrooibureau

(57) ABSTRACT

The present invention relates to infant formulas and follow-on formulas containing optimised amino acid profiles, in particular optimised amounts and/or ratios of phenylalanine. The formulas may contain intact proteins, hydrolysed proteins, protein fractions, free amino acids and/or a combination thereof selected based on their ability to provide the formula with an optimised amino acid profile. The present invention also relates to the administration of these formulas to infants in order to achieve balanced growth and/or development, for promoting, assisting or achieving balanced growth or development of the brain of an infant and/or the cognitive function of an infant, and may also assist in preventing or reducing the risk of obesity later in life.

4 Claims, 5 Drawing Sheets

(51) Int. Cl.
A23L 33/185 (2016.01)
A23L 33/00 (2016.01)
A23L 33/175 (2016.01)

(52) U.S. Cl.
CPC ............. *A23L 33/185* (2016.08); *A23L 33/40* (2016.08); *A23V 2002/00* (2013.01)

(56) References Cited

U.S. PATENT DOCUMENTS

| | | | |
|---|---|---|---|
| 2002/0106436 A1 | 8/2002 | Gohman et al. | |
| 2003/0124237 A1 | 7/2003 | Kuhlman et al. | |
| 2005/0064014 A1 | 3/2005 | Finot et al. | |
| 2008/0032002 A1 | 2/2008 | Anthony et al. | |
| 2011/0183040 A1* | 7/2011 | Ermolin .................. | A23L 1/296 426/72 |
| 2011/0244072 A1 | 10/2011 | Fichot et al. | |
| 2012/0015077 A1* | 1/2012 | Secretin .................... | A61P 1/00 426/61 |
| 2013/0079276 A1* | 3/2013 | Van Goudoever ..... | A61K 38/02 514/4.8 |

FOREIGN PATENT DOCUMENTS

| | | |
|---|---|---|
| EP | 0148680 A1 | 7/1985 |
| EP | 0 418 593 A2 | 3/1991 |
| EP | 1 932 437 A1 | 6/2008 |
| WO | WO-2007/088160 | 8/2007 |
| WO | WO-2007/121807 A1 | 11/2007 |
| WO | WO-2010/112430 A1 | 10/2010 |
| WO | WO-2011/119023 A1 | 9/2011 |
| WO | WO-2014/081284 A1 | 5/2014 |

OTHER PUBLICATIONS

Huang et al., The Essential Amino Acid Requirements of Infants, Erasmus Universiteit Rotterdam, Sep. 26, 2012, entire book. (Year: 2012).*
Bindels et al., Recent Developments in Infant Nutrition, Chapter 21, Kluwer Academic Publishers, 1996. (Year: 1996).*
Hogewind-Schoonenboom et al., Phenylalanine requirements of enterally fed term and preterm neonates, Am J Clin Nutr 2015;101: 1155-62; Apr. 29, 2015. (Year: 2015).*
Roberts et al., The Effect of Graded Intake of Glycyl-L-Tyrosine on Phenylalanine and Tyrosine Metabolism in Parenterally Fed Neonates with an Estimation of Tyrosine Requirement, Pediatric Research, vol. 49, No. 1, 2001, p. 111-119. (Year: 2001).*
Pratt et al., The Threonine Requirement of the Normal Infant, J Nutr, 1955. 56(2): p. 231-251. (Year: 1955).*
Zhang et al., Amino Acid Profiles in Term and Preterm Human Milk through Lactation: A Systematic Review, Nov. 26, 2013, Nutrients, 5, 4800-4821. (Year: 2013).*
Agostini et al., "Enteral nutrient supply for preterm infants: commentary from the European Society for paediatric gastroenterology, hepatology, and nutrition committee on nutrition", JPGN, Jan. 2010, vol. 50, No. 1, pp. 85-91.
Dewey et al., "Growth of breast-fed and formula-fed infants form 0 to 18 months: the DARLING study", Pediatrics, Jun. 1992, vol. 89, No. 6, pp. 1035-1041.
Dewey, "Growth characteristics of breast-fed compared to formula-fed infants", Biol. Neonate, 1998, vol. 74, pp. 94-105.
Gale et al., "Effect of breastfeeding compared with formula feeding on infant body composition: a systematic review and meta-analysis", American Society for Nutrition, 2012, pp. 1-14.
Gunther et al., Protein intake during the period of complementary feeding and early childhood and the associate with body mass index and percentage body fat at 7 y of age, The American Journal of Clinical Nutrition, 2007, vol. 85, pp. 1626-1633.
Heinig et al., Energy and protein intakes of breast-fed and formula-fed infants during the first year of life and their association with growth velocity: the DARLING Study, The American Journal of Clinical Nutrition, 1993, vol. 58, pp. 152-161.
Koletzko et al., "Lower protein in infant formula is associated with lower weight up to age 2 y: a randomized clinical trial" The American Journal of Clinical Nutrition, 2009, vol. 89, pp. 1836-1845.
Ballhausen et al., "Born at 27 weeks of gestation with classical PKU: challenges of dietetic management in a very preterm infant", Pediatric Reports, 2011, vol. 3:e26, pp. 103, 105, 107.
Database Caplus [Online] Chemical Abstracts Service, Guettler et al., "Serum tyrosine within the first hour after an oral lod of phenylalanine", XP002737745, retrieved from stn Database accession No. 1978:488340, abstract.
International Search Report issued in International Patent Application No. PCT/NL2014/050315, dated Apr. 24, 2015.
International Search Report issued in International Patent Application No. PCT/NL2014/050314, dated Mar. 25, 2015.
International Search Report of PCT/NL2012/050832, dated Sep. 10, 2013.
Aleria et al., "Isocratic high-performance liquid chromatographic determination of tryptophan in infant formulas", Journal of Chromatography A, 721,1996, p. 83-88.
Synderman et al., "The Essential Amino Acid Requirements of Infants: X. Methionine", American Journal of Clinical Nutrition, vol. 15, Dec. 1964, p. 322-330.
Huang et al., "Lysine requirement of the enterally fed term infant in the first month of life", The American Journal of Clinical Nutrition, vol. 94, issue 6, Dec. 1, 2011, p. 1496-1503; published online Apr. 4, 2012.
Huang et al., "Methionine requirement of the enterally fed term infant in the first month of life in the presence of cysteine", The American Journal of Clinical Nutrition, vol. 95, issue 5, May 1, 2012, p. 1048-1054; published online Apr. 4, 2012.
Riedijk et al. "Cysteine: a conditionally essential amino acid in low-birth-weight preterm infants?." The American journal of clinical nutrition 86.4 (2007): 1120-1125.
Snyderman et al. "The histidine requirement of the infant." Pediatrics 31.5 (1963): 786-801.

* cited by examiner

FORMULAS COMPRISING OPTIMISED AMINO ACID PROFILES

CROSS-REFERENCE TO RELATED APPLICATIONS

This application is the National Phase of International Patent Application No. PCT/NL2014/050314, filed May 19, 2014, published on Nov. 26, 2015 as WO 2015/178761 A1. The contents of which are herein incorporated by reference in its entirety.

FIELD

The present invention relates to infant formulas and follow-on formulas containing optimised amino acid profiles, in particular optimised concentrations and/or weight ratios of phenylalanine. The formulas may contain intact proteins, hydrolysed proteins, protein fractions, free amino acids and/or a combination thereof selected based on their ability to provide the formula with an optimised amino acid profile. The present invention also relates to the administration of these formulas to infants, particularly term infants, in order to achieve balanced growth and/or development, in particular balanced growth and/or development of the brain of infants, and may also assist in preventing or reducing the risk of obesity later in life.

BACKGROUND

Amino acids are essential building blocks of proteins in the human body. Some amino acids are classified as essential, meaning that the human body cannot synthesise the amino acid so it must be sourced from the diet. The essential amino acids for humans are valine, isoleucine, leucine, lysine, methionine, threonine, phenylalanine, histidine, and tryptophan. Cysteine and tyrosine are considered to be conditionally essential amino acids, because of their strong link to methionine and phenylalanine respectively. The remaining amino acids (alanine, arginine, asparagine, aspartic acid, glutamic acid, glutamine, glycine, proline, and serine) are non-essential amino acids and can either be synthesised or sourced from the diet.

Infant formulas typically contain a higher level of total protein compared to human milk. This is despite the generally accepted hypothesis that too much protein leads to differences in postprandial metabolic kinetics, and ultimately, differences in growth and development. For instance, some key examples are the differences in early growth and improved body composition of breastfed infants when compared to formula fed infants (Dewey, 1992; Dewey 1998; and Gale, 2012), and the association of high protein levels in early nutrition with an increase in childhood adiposity (Heinig, 1993; and Koletzko, 2009).

The fact that the proteins used in infant formulas do not typically match the protein quality (e.g., amino acid levels or profile) of human breast milk has also been considered a contributing factor to these differences (Günther, 2007), although it has not been investigated to the same extent.

There is an important role for phenylalanine, an essential aromatic amino acid that is used for protein synthesis and serves as precursor via phenylalanine hydroxylation to tyrosine, the monoamine signalling molecules dopamine, norepinephrine, epinephrine, as well as the skin pigment melanin. Phenylalanine can, in large quantities, interfere with the production of serotonin. The body changes phenylalanine into tyrosine, another amino acid needed to make proteins, brain chemicals, including L-dopa, epinephrine, and norepinephrine, and thyroid hormones.

Because norepinephrine affects mood, different forms of phenylalanine have been proposed to treat depression. Symptoms of phenylalanine deficiency include confusion, lack of energy, depression, decreased alertness, memory problems, and lack of appetite. On the other hand, a rare metabolic disorder called phenylketonuria (PKU) occurs in people who are missing an enzyme that the body needs to use phenylalanine. That causes high levels of phenylalanine to build up. If it is not treated before 3 weeks of age, PKU can cause severe, irreversible intellectual disability. It is therefore important to find the right balance of phenylalanine in a young infant's diet.

SUMMARY

In work leading up to the present invention the present inventors researched amino acid uptake and protein synthesis by infants and discovered that an infant's requirements of essential amino acids do not necessarily appear to be in line with existing expectations, recommendations, individual protein sources, or products. More specifically, the inventors have found that infants' requirements of some large neutral amino acids, in particular phenylalanine, are lower than the amounts currently recommended and applied in infant formulas, as well as those present in human milk. The present inventors established the phenylalanine requirement of infants to be about 58 mg/kg per day which is 58-70 mg/kg per day with a 20% variation permitted (e.g. to compensate for product-allowed variation).

The recommended volume intake of an infant is 150 $mL \cdot kg^{-1} \cdot d^{-1}$ (Shaw, 2001). This number may suitably be used to convert the recommended amino acid intake throughout the description by dividing the recommended amino acid intake (in $mg \cdot kg^{-1} \cdot d^{-1}$) by the recommended volume intake of 150 $mL \cdot kg^{-1} \cdot d^{-1}$ and multiplying by 100. This is described herein as the recommended dietary intake for each amino acid, expressed in mg (amino acid)/100 mL (infant formula). This recommended dietary intake range can also be converted into units of g (amino acid)/100 g protein by assuming a protein intake level of 0.9-1.4 g (protein)/100 mL (infant formula), or 900-1,400 mg (protein)/100 mL (infant formula) (Koletzko, 2009), which protein intake level correlates to 1.4 to 2.1 g protein/100 kcal infant formula based on an energy level of 66 kcal per 100 mL.

The requirement of 58 mg/kg per day was thus subsequently determined to be about 39 mg/100 mL (formula), or 39-46 mg/100 mL (formula) also with a 20% variation, and 2.8-4.3 g/100 g (protein). This suggests that the phenylalanine levels required by infants are considerably (and unexpectedly) lower than those in existing commercial formulas and in human milk. For instance, in commercial cow milk-based infant formula, phenylalanine levels are 49-65 mg/100 ml (73.5-97.5 mg/kg/day). The ESPGHAN recommendation (Koletzko, 2005) for phenylalanine is 81 mg/100 kcal. With an infant formula providing 66 kcal per 100 ml, this results in recommended intake of 53.5 mg of phenylalanine per 100 ml or 80.2 mg/kg/day (when given 150 ml/kg/day). The joint WHO/FAO/UNU expert consultation recommend 162 mg/kg/day total aromatic amino acids for infants up to 1 month old, with a separate phenylalanine and tyrosine requirement of 72 mg/kg/day and 90 mg/kg/day, respectively.

The inventors have further discovered that it is amino acid composition of the protein rather than the absolute protein level that needs primary consideration when developing infant formulas. These insights are detailed further below, in the experimental section.

Based on these findings, the inventors have developed protein formulations that are optimised in terms of phenylalanine content, and more preferably also in terms of tryptophan, threonine and large neutral amino acid (LNAA) content, including formulations comprising intact proteins, hydrolysed proteins, protein fractions, free amino acids and/or combinations thereof. The formulations are proposed to promote balanced growth and/or development (e.g., brain, cognitive function, body, body composition). More specifically, based on the inventor's findings, it is proposed that formulations can be produced with reduced levels of phenylalanine and preferably also tryptophan relative to the other large neutral amino acids (viz. leucine, isoleucine, methionine, tyrosine and valine), resulting in less transporter competition and better bioavailability of the LNAA. This may induce increased muscle accretion and cerebral protein synthesis, resulting in improved brain growth and brain development and cognitive function of an infant, as well as in improved growth or development of the body of an infant and/or the infant's body composition.

It is also proposed that such formulations can be produced with altered (e.g., lowered) levels of total protein yet with optimised amino acid profiles, thus meeting the needs of infants and therefore promoting balanced growth and/or development in infants while preventing or reducing the risk of obesity in the infant at a later stage of life, and also to prevent or reduce the risk of obesity-related diseases and conditions such as metabolic diseases (e.g., metabolic syndrome, diabetes), and cardiovascular disease.

Thus, according to one aspect of the present invention, we provide a proteinaceous composition comprising optimised amounts and/or ratios of phenylalanine. Suitably, we provide a proteinaceous composition comprising optimised amounts and/or ratios of phenylalanine and also optimised amounts and/or ratios of tryptophan, threonine and LNAAs. The proteinaceous composition may comprise intact proteins, hydrolysed proteins, protein fractions, free amino acids and/or a combination thereof. The proteinaceous composition is suitably intended to be part of an infant formula or a follow-on formula, and is suitably intended for a human infant, preferably term infants.

Based on the inventors' findings as outlined herein, in some embodiments (a), the proteinaceous composition comprises 2.8-4.3 g phenylalanine per 100 g protein. Suitably, the proteinaceous composition comprises 2.9-4.1 g, preferably 3.0-3.9 g, more preferably 3.1-3.8 g, even more preferably 3.2-3.7 g, yet even more preferably 3.3-3.6 g, most preferably 3.4-3.5 g phenylalanine per 100 g protein.

Associated therewith, in some embodiments (b), the proteinaceous composition comprises a weight ratio of phenylalanine to the sum of the large neutral amino acids isoleucine, leucine, valine, tryptophan, tyrosine, and methionine, which are all present in the proteinaceous composition, in the range of from 1:7.237 (0.138) to 1:10.810 (0.0925). In human milk, the Phe:LNAA weight ratio is 1:6.93 (0.144) (WHO/FAO/UNU, 2007).

Large neutral amino acids, including phenylalanine (Phe), compete for transport across the blood-brain barrier (BBB) via the L-type amino acid carrier, as well as at the gut-blood barrier (Pietz 1999). Accordingly, elevated plasma Phe impairs brain uptake of other LNAAs in patients with phenylketonuria (PKU). Direct effects of elevated brain Phe and depleted LNAAs are probably major causes for disturbed brain development and function in PKU. One of the therapeutic strategies in PKU is supplementing LNAA to the patients, based on the rationale that this will favourably increase the LNAA transport at the blood-brain barrier (BBB), but also at the gut-blood barrier, resulting in lower phenylalanine levels in the brain and plasma, respectively. The present findings suggest that the ratio based on the requirements by infants is considerably (and unexpectedly) lower than that existing in human milk. These insights could mean that the LNAA involved in protein accretion will have a better bioavailability due to less transporter competition. As a result, the lower ratio of phenylalanine to the other LNAAs might induce a higher growth in lean body mass (muscle accretion) as well as brain development by increased cerebral protein synthesis. Suitably, the proteinaceous composition comprises a weight ratio of phenylalanine to the sum of isoleucine, leucine, valine, tryptophan, tyrosine and methionine of from 1:7.6 (0.132) to 1:10.2 (0.098), more preferably a ratio of from 1:8.1 (0.123) to 1:9.7 (0.103), even more preferably a ratio of from 1:8.3 (0.120) to 1:9.6 (0.104), yet even more preferably a ratio of from 1:8.4 (0.119) to 9.5 (0.105), most preferably a ratio of from 1:8.5 (0.118) to 1:9.4 (0.106).

In an exemplary embodiment, the proteinaceous composition complies with at least (a) as described here above. In a preferred embodiment the proteinaceous composition complies with at least both (a) and (b) as described here above. The composition may further involve one or more of the features outlined here below.

There is provided, according to another aspect of the present invention, a formula comprising the proteinaceous composition as defined above. In addition or alternatively, there is provided a formula comprising 39-46 mg phenylalanine per 100 mL of formula and/or providing, or being formulated to provide phenylalanine in an amount of 58-70 mg per kg body weight per day (mg/kg body weight/day). Suitably, the formula comprises 39-46 mg phenylalanine per 100 mL of formula and provides, or is formulated to provide, phenylalanine in an amount of 58-70 mg per kg body weight per day.

In a further aspect of the invention, there is provided a formula comprising a proteinaceous composition, wherein the formula:
  a) comprises 2.8-4.3 g phenylalanine per 100 g protein;
  b) comprises 39-46 mg phenylalanine per 100 mL formula;
  c) provides, or is formulated to provide phenylalanine in an amount of 58-70 mg/kg body weight per day; and/or
  d) comprises a weight ratio of phenylalanine to the sum of isoleucine, leucine, valine, tryptophan, tyrosine, and methionine of from 1:7.237 (0.138) to 1:10.810 (0.0925), preferably of from 1:7.6 (0.132) to 1:10.2 (0.098).

According to another aspect of the present invention, there is provided a formula as defined herein for use in promoting, assisting or achieving balanced growth or development in an infant. Also provided is the use of a composition in the manufacture of a formula as defined herein for promoting, assisting or achieving balanced growth or development in an infant. Also provided is a method for promoting, assisting or achieving balanced growth or development in an infant, wherein the method comprises administering to the infant a formula as defined herein.

As another aspect of the present invention, there is provided a formula as defined herein for use in preventing or reducing the risk of unbalanced growth or development in an infant. Also provided is the use of a composition in the manufacture of a formula as defined herein for preventing or reducing the risk of unbalanced growth or development in an infant. Also provided is a method for preventing or reducing the risk of unbalanced growth or development in an infant, wherein the method comprises administering to the infant a formula as defined herein. The formula is preferably an infant formula comprising the proteinaceous composition as described in the context of the invention.

As used herein, the term "growth or development" may refer to growth and development of the brain of an infant and/or the cognitive function of the infant as discussed further below, and/or to growth and development of the body of an infant and/or the infant's body composition, also as discussed further below.

According to another aspect, there is provided a formula as defined herein for use in preventing or reducing the risk of obesity later in life in an infant. Also provided is the use of a composition in the manufacture of a formula as defined herein for preventing or reducing the risk of obesity later in life in an infant. Also provided is a method for preventing or reducing the risk of obesity later in life in an infant, wherein the method comprises administering to the infant a formula as defined herein. The formula is preferably an infant formula comprising the proteinaceous composition as described in the context of the invention.

The proteinaceous compositions and formulas of the various aspects of the invention are discussed in more detail further below.

LIST OF PREFERRED EMBODIMENTS

Figure 1:
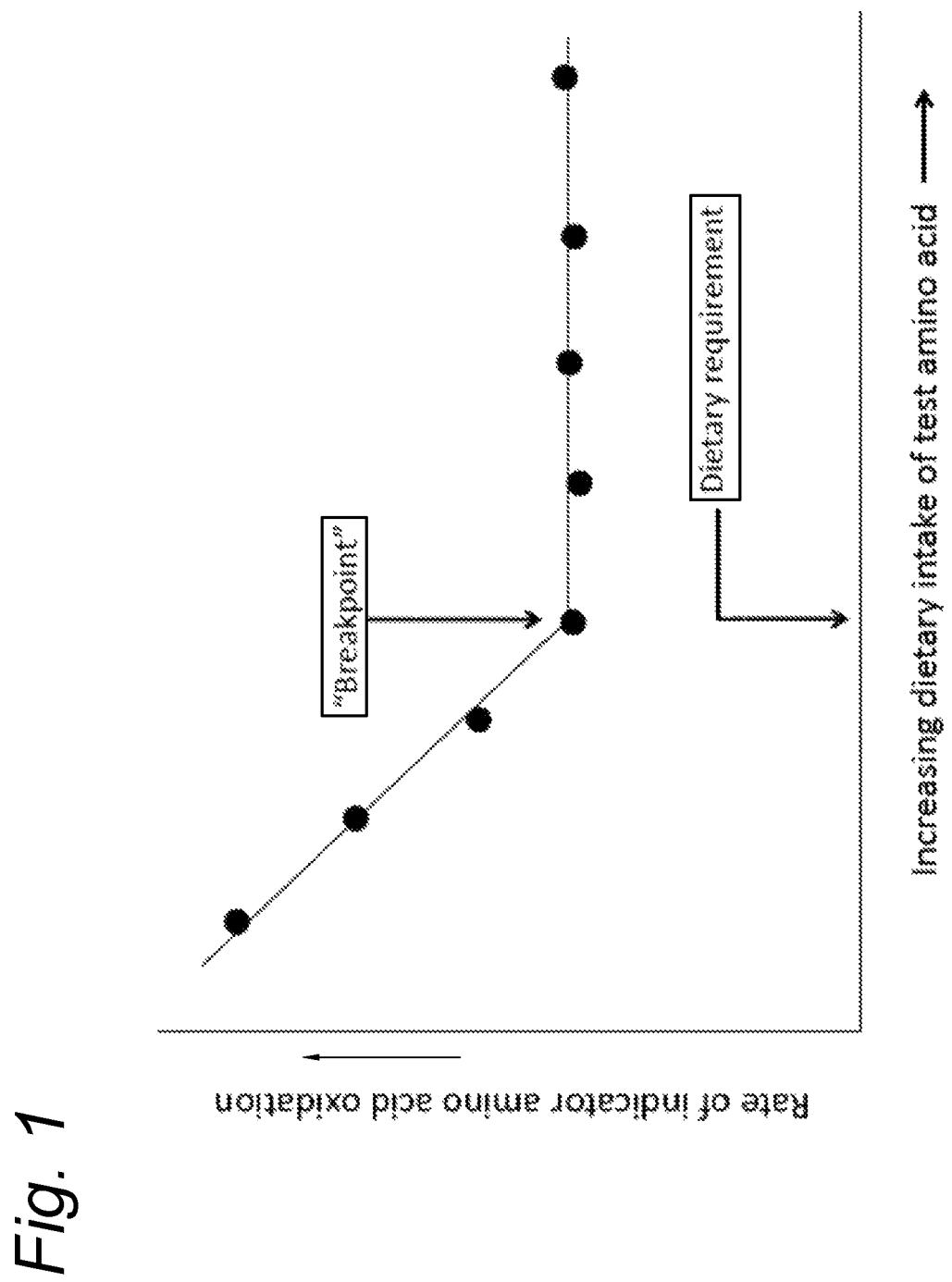
FIG. 1 shows an example of a graph plotted by the IAAO method for a test amino acid as described in the introduction for Example 1.

1. A formula comprising a proteinaceous composition, wherein the formula:
   a) comprises 2.8-4.3 g phenylalanine per 100 g protein;
   b) comprises 39-46 mg phenylalanine per 100 mL formula;
   c) provides, or is formulated to provide phenylalanine in an amount of 58-70 mg/kg body weight per day; and/or
   d) comprises a weight ratio of phenylalanine to the sum of isoleucine, leucine, valine, tryptophan, tyrosine, and methionine of from 1:7.237 (0.138) to 1:10.810 (0.0925).
2. The formula of embodiment 1, comprising 10-12 mg tryptophan per 100 mL formula and/or providing, or being formulated to provide tryptophan in an amount of 15-17 mg/kg body weight per day.
3. The formula of embodiment 1 or 2, comprising a weight ratio of tryptophan to the sum of isoleucine, leucine, valine, phenylalanine, tyrosine, and methionine of from 1:30.327 (0.0330) to 1:45.304 (0.0221).
4. The formula according to any one of embodiments 1-3, comprising 45-52 mg threonine per 100 mL formula, and/or providing, or being formulated to provide threonine in an amount of 68-78 mg/kg body weight per day.
5. The formula according to any one of embodiments 1-4, comprising a ratio of phenylalanine to threonine of from 1:0.959 (1.042) to 1:1.433 (0.698).
6. The formula according to any one of embodiments 1-5, being an infant formula.
7. The formula according to embodiment 6, comprising 0.9 to 1.4 g of protein per 100 mL of infant formula and/or 1.4 to 2.1 g of protein per 100 kcal of infant formula.
8. Use of a composition in the manufacture of a formula for providing nutrition to an infant, wherein the formula is a formula according to any one of embodiments 1-7.
9. Use of a composition in the manufacture of a formula for promoting, assisting or achieving balanced growth or development in an infant and/or for preventing or reducing the risk of unbalanced growth or development in an infant, wherein the formula is a formula according to any one of embodiments 1-7.
10. Use of a composition in the manufacture of a formula for promoting, assisting or achieving balanced growth or development of the brain of an infant and/or the cognitive function of an infant, wherein the formula is a formula according to any one of embodiments 1-7.
11. Use of a composition in the manufacture of a formula for promoting, assisting or achieving balanced growth or development of the body of an infant and/or the infant's body composition, wherein the formula is a formula according to any one of embodiments 1-7.
12. Use of a composition in the manufacture of a formula for preventing or reducing the risk of obesity later in life in an infant, wherein the formula is a formula according to any one of embodiments 1-7.
13. Use according to any of embodiments 8-12, wherein said infant is a term infant.
14. Method for providing nutrition to an infant; and/or for promoting, assisting or achieving balanced growth or development in an infant and/or for preventing or reducing the risk of unbalanced growth or development in an infant; and/or for preventing or reducing the risk of obesity later in life in an infant, said method comprising administering a formula according to any one of embodiments 1-7 to said infant.
15. Method of embodiment 14, for promoting, assisting or achieving balanced growth or development of the brain of the infant and/or the cognitive function of the infant.
16. Method of embodiment 14, for promoting, assisting or achieving balanced growth or development of the body of an infant and/or the infant's body composition.

17. A proteinaceous composition comprising:
    a) 2.8-4.3 g phenylalanine per 100 g protein; and/or
    b) a weight ratio of phenylalanine to the sum of isoleucine, leucine, valine, tryptophan, tyrosine, and methionine of from 1:7.237 (0.138) to 1:10.810 (0.0925).
18. The proteinaceous composition of embodiment 17, comprising a ratio of phenylalanine to threonine of from 1:0.959 (1.042) to 1:1.433 (0.698).
19. The proteinaceous composition of embodiment 17 or 18, comprising 0.7-1.1 g tryptophan per 100 g of protein.
20. The proteinaceous composition of any one of embodiments 17-19, comprising a weight ratio of tryptophan to the sum of isoleucine, leucine, valine, phenylalanine, tyrosine, and methionine of from 1:30.327 (0.0330) to 1:45.304 (0.0221).
21. Formula for use in providing nutrition to an infant; and/or for use in promoting, assisting or achieving balanced growth or development in an infant and/or for use in preventing or reducing the risk of unbalanced growth or development in an infant; and/or for use in preventing or reducing the risk of obesity later in life in an infant, comprising administering a formula according to any one of embodiments 1-7 to said infant, preferably a term infant.
22. Formula for use according to embodiment 21, for use in promoting, assisting or achieving balanced growth or development of the brain of the infant and/or the cognitive function of the infant, preferably a term infant.
23. Formula for use according to embodiment 21, for use in promoting, assisting or achieving balanced growth or development of the body of an infant and/or the infant's body composition, preferably a term infant.

The embodiments will be detailed here below.

DETAILED DESCRIPTION OF THE INVENTION

Proteinaceous Composition—Amino Acid Profile
Phenylalanine

The present invention is based on the inventors' discovery of the requirements of infants for phenylalanine by actual measurements of requirement levels in formula-fed infants, and the subsequent determination of those levels in the context of product (e.g., infant formula or follow-on formula) development, as well as the development of optimised amino acid profiles with optimised amounts of phenylalanine and formulations suitable to achieve these profiles, including formulations comprising intact proteins, hydrolysed proteins, protein fractions, free amino acids and/or combinations thereof.

Interestingly, it is noted that the requirement of phenylalanine deviates from the levels reported in human milk, or used in commercially available infant formulas. Thus, the inventors surprisingly discovered that the levels of essential amino acids and particularly phenylalanine required for protein synthesis (and therefore for growth and development) in term infants are met at formula intake levels where the intake levels differs distinctly from that found in human breast milk and in commercially available formulas, and where the ratios between phenylalanine and several other amino acids differs distinctly from those found in human milk and in commercially available formulas. Further, the ratio between phenylalanine and the neutral amino acids valine, leucine, isoleucine, tryptophan, tyrosine, and methionine was calculated to be different to that found in human milk and/or commercially available formulas. As noted herein above, the present findings suggest that the ratio of phenylalanine to the other LNAAs (valine, leucine, isoleucine, tryptophan, tyrosine, and methionine) based on the requirements by infants is considerably (and unexpectedly) lower than that existing in human milk. These insights could mean that by reducing phenylalanine levels relative to the other LNAAs, the large neutral amino acids involved in protein accretion will have a better bioavailability due to less transporter competition. As a result, the lower Phe:LNAA ratio may induce a higher growth in lean body mass (muscle accretion) as well as brain development by increased cerebral protein synthesis.

Furthermore, too high levels of phenylalanine might interfere with the development of balanced growth and/or body composition, including lean body mass, by influencing the uptake of large neutral amino acids. Thus, using the new phenylalanine levels and ratios of phenylalanine to neutral amino acids valine, leucine, isoleucine, tryptophan, tyrosine, and methionine in compositions may allow for compositions that promote balanced growth and/or development, as further described herein. The new phenylalanine levels and ratios based thereupon may also allow for effective lowering of total protein levels in infant formula.

The recommended volume intake of an infant is 150 $mL \cdot kg^{-1} \cdot d^{-1}$ (Shaw, 2001). This number can be used to convert the recommended amino acid intake by dividing the recommended amino acid intake (in $mg \cdot kg^{-1} \cdot d^{-1}$) by the recommended volume intake of 150 $mL \cdot kg^{-1} \cdot d^{-1}$ and multiplying by 100. This is described herein as the recommended dietary intake for each amino acid, expressed in mg (amino acid)/100 mL (infant formula). This recommended dietary intake range can also be converted into units of g (amino acid)/100 g protein by assuming a protein intake level of 0.9-1.4 g (protein)/100 mL (infant formula), or 900-1,400 mg (protein)/100 mL (infant formula) (Koletzko, 2009), which protein intake level correlates to 1.4 to 2.1 g protein/100 kcal infant formula based on an energy level of 66 kcal per 100 mL.

The requirement of 58 mg/kg per day was thus subsequently determined to be about 39 mg/100 mL (formula), or 39-46 mg/100 mL (formula) also with a 20% variation, and 2.8-4.3 g/100 g (protein).

The invention thus pertains to a proteinaceous composition comprising at least one of: (a) 2.8-4.3 g phenylalanine per 100 g protein, preferably 2.9-4.1 g, more preferably 3.0-3.9 g, more preferably 3.1-3.8 g, even more preferably 3.2-3.7 g, yet even more preferably 3.3-3.6 g, most preferably 3.4-3.5 g phenylalanine per 100 g of protein; and (b) a weight ratio of phenylalanine to the sum of the large neutral amino acids (LNAAs) isoleucine, leucine, valine, tryptophan, tyrosine, and methionine of from 1:7.237 (0.138) to 1:10.810 (0.0925), preferably of from 1:7.6 (0.132) to 1:10.2 (0.098), more preferably a ratio of from 1:8.1 (0.123) to 1:9.7 (0.103), even more preferably a ratio of from 1:8.3 (0.120) to 1:9.6 (0.104), yet even more preferably a ratio of from 1:8.4 (0.119) to 9.5 (0.105), most preferably a ratio of from 1:8.5 (0.118) to 1:9.4 (0.106).

Most preferably, the composition of the invention complies with both (a) and (b).

Tryptophan

The present inventors further established the tryptophan requirement of infants to be 15 $mg \cdot kg^{-1} \cdot d^{-1}$, and this was subsequently determined to be 10-12 mg/100 mL (formula) and 0.7-1.1 g/100 g (protein). This finding is also in contrast to the literature which generally teaches that infant formulas with increased levels of tryptophan are beneficial for infants (Trabulsi, 2011; and Sandström, 2008). Commercial formulas typically provide tryptophan (Trp) ranging from 24-32 mg·kg$^{-1}$·d$^{-1}$ when given 150 mL·kg$^{-1}$·d$^{-1}$ (Viadel, 2000). This suggests that the tryptophan levels required by infants are considerably (and unexpectedly) lower than those in existing commercial formulas, and that knowledge may be used to optimise the formula even further.

Therefore, in a preferred embodiment, the proteinaceous composition further comprises 0.7-1.1 g tryptophan per 100 g protein. Preferably, the proteinaceous composition comprises at most 1.0 g tryptophan per 100 g protein, more preferably at most 0.9 tryptophan per 100 g protein. It is preferred that the proteinaceous composition comprises at least 0.8 g tryptophan per 100 g protein.

The weight ratio of tryptophan to the sum of valine, leucine, isoleucine, phenylalanine, tyrosine, and methionine is on average 1:18.6 (0.054) for human milk (WHO/FAO/UNU, 2007), which is the reference value for most commercial products currently on the market. The inventors found that the formula could be optimised even further if that weight ratio is even more reduced. Accordingly, it appears that if an infant formula were to be developed to meet the higher ratios based on the earlier publications and the value for human milk, there may be a risk that the formula would contain too much tryptophan.

In another preferred embodiment, the proteinaceous composition thus comprises a weight ratio of tryptophan to the sum of isoleucine, leucine, valine, phenylalanine, tyrosine, and methionine of from 1:30.327 (0.0330) to 1:45.304 (0.0221), preferably of from 1:30.5 (0.0328) to 1:44.0 (0.0227). Suitably, the proteinaceous composition comprises a weight ratio of tryptophan to the sum of isoleucine, leucine, valine, phenylalanine, tyrosine, and methionine of from 1:31.0 (0.0323) to 1:42.5 (0.0235), even more suitably, a weight ratio of from 1:32.0 (0.0313) to 1:40.5 (0.0247), yet even more suitably of from 1:34.0 (0.0294) to 1:40.0 (0.0250), most suitably a weight ratio of tryptophan to the sum of isoleucine, leucine, valine, phenylalanine, tyrosine, and methionine of from 1:36.0 (0.0278) to 1:39.0 (0.0256).

Suitably, the proteinaceous composition according to the invention comprises both the above tryptophan levels and weight ratios of tryptophan vs. other LNAAs, for instance a proteinaceous composition comprising 0.7-1.1 g tryptophan per 100 g protein and comprising a weight ratio of tryptophan to the sum of isoleucine, leucine, valine, phenylalanine, tyrosine, and methionine of from 1:30.327 (0.0330) to 1:45.304 (0.0221), preferably of from 1:30.5 (0.0328) to 1:44.0 (0.0227). Suitably, the proteinaceous composition comprises a weight ratio of tryptophan to the sum of isoleucine, leucine, valine, phenylalanine, tyrosine, and methionine of from 1:31.0 (0.0323) to 1:42.5 (0.0235), even more suitably, a weight ratio of from 1:32.0 (0.0313) to 1:40.5 (0.0247), yet even more suitably of from 1:34.0 (0.0294) to 1:40.0 (0.0250), most suitably a weight ratio of tryptophan to the sum of isoleucine, leucine, valine, phenylalanine, tyrosine, and methionine of from 1:36.0 (0.0278) to 1:39.0 (0.0256).

Tryptophan is required for the formation of serotonin. Serotonin, being a neurotransmitter, plays an important role in the brain and helps to relay messages from one part of the brain to another. Most brain cells are directly or indirectly associated with serotonin, including cells that relate to mood, appetite, sleep, memory, learning, and some social behaviours. Dietary tryptophan intake has been shown to modulate sleep pattern in infants. Considering the role of tryptophan in the serotonin pathway, the present inventors' findings with regards to tryptophan levels may indicate that an infant's body does not require significant levels of tryptophan for growth and therefore any excess may lead to higher levels of serotonin in the brain. High serotonin levels are undesirable as this may detrimentally affect cortex development (Riccio, 2011) thereby increasing the risk for psychiatric disease in later life. High serotonin levels have been associated with a risk of affective disorders, depression and schizophrenia. High long-term dietary intake of tryptophan has also been associated with insulin sensitivity in animal studies (Koopmans, 2009).

Since the neutral amino acids compete with the uptake of tryptophan through the blood brain barrier, also referred to as transporter competition (Dörner, 1983; and Heine, 1999), the new insights may have possible implications on brain development of infants. In addition, analogous to what is noted herein above for phenylalanine, due to reduced transporter competition from tryptophan, the large neutral amino acids involved in protein accretion will have a better bioavailability (Cansev, 1997). As a result, the lower Trp:LNAA ratio may induce a higher growth in lean body mass (muscle accretion) as well as brain development by increased cerebral protein synthesis.

There may also be effects on obesity given the role of tryptophan and its metabolites in appetite and food intake regulation (Dörner, 1983). This forms the rationale for many publications and infant formulas that focus on lowering protein levels (to avoid unnecessary metabolic load), while providing the right amount of tryptophan to the infant, mainly achieved by enrichment of whey-fractions such as alpha-lactalbumin (Heine, 1996; and Lien, 2003).

The insulin response to a carbohydrate containing meal in adults will induce a transfer of large neutral amino acids into muscle tissue, which as a result produces a relatively high plasma tryptophan to large neutral amino acid ratio, enhancing the transfer of tryptophan into the brain (Lien, 2003). Infants, however, have a higher level of glucagon and epinephrine, which limits the insulin-induced flow of large neutral amino acids into muscle tissue. Combined with lower muscle mass, and a relatively high protein intake per kilogram of bodyweight, it has been stated that infants rely more heavily on the dietary balance of tryptophan to large neutral amino acids to maintain adequate brain tryptophan uptake (Lien, 2003).

Accordingly, it is believed that it may be beneficial to consider the level of tryptophan in formulas in the context of optimal balanced levels of neutral amino acids. It also appears that the tryptophan results of the present invention may support a lowering of the levels of the neutral amino acids, which is reflected in the amino acid profile determined herein when compared with the profiles found in human milk or in commercially available formulas.

Threonine

The present inventors further established the threonine requirement of infants to be 68 mg·kg$^{-1}$·d$^{-1}$, and this was subsequently determined to be 45-54 mg/100 mL (formula) and 3.2-5.0 g/100 g (protein). Commercial formulas typically provide threonine ranging from 105-125 mg·kg$^{-1}$·d$^{-1}$ when given 150 mL·kg$^{-1}$·d$^{-1}$ (Viadel, 2000). This suggests that the threonine levels required by infants are considerably (and unexpectedly) lower than those in existing commercial formulas.

In a further embodiment, the proteinaceous composition thus comprises a weight ratio of phenylalanine to threonine of from 1:0.959 (1.042) to 1:1.433 (0.698). In human milk, the phenylalanine:threonine ratio is 1:1.05 (0.955) (WHO 2007), but the inventors found that these ratios could in fact be lowered. Preferably, the proteinaceous composition comprises a weight ratio of phenylalanine to threonine of from 1:1.00 (1.000) to 1:1.430 (0.699), more preferably of from 1:1.025 (0.976) to 1:1.410 (0.709), even more preferably from 1:1.045 (0.957) to 1:390 (0.719), even more preferably of from 1:1.050 (0.952) to 1:1.370 (0.730), yet even more preferably of from 1:1.055 (0.948) to 1:1.350 (0.741), most preferably from 1:1.060 (0.943) to 1:1.330 (0.752).

Dietary threonine reduces plasma phenylalanine levels in patients with hyperphenylalaninemia. Hyperthreoninemia has been associated with seizures and growth retardation (Reddi, 1978) and other undesirable conditions including congenital amaurosis (Hayasaka, 1986). Commercial dairy-based formulas therefore typically use acid whey to reduce the risk of hyperthreoninemia (Rigo, 2001). Nevertheless, as the threonine requirements determined in the present invention appear to be even lower than the levels of current formulas that are expected to be safe, there may still be a risk that infants receive through existing commercial formulas more threonine than they require. In addition, infants fed with formula are reported to have a lower capacity to oxidise threonine compared to breastfed infants (Darling, 1999). Moreover, the use of acid whey (to reduce threonine levels in infant formulas) will also result in higher tryptophan levels, which are considered, in contrast to current beliefs, undesirable (see below).

An excessive dietary content of threonine (i.e., higher levels than human milk and existing commercial formulas) has been shown to elevate threonine levels and glycine levels in various tissues, including the brain (Castagné, 1993; and Boehm, 1998). This increase of glycine levels in the brain is believed to affect the neurotransmitter balance in the brain, which may have consequences for brain development (Boehm, 1998).

Accordingly, the present invention contemplates proteinaceous compositions and infant formulas comprising threonine levels that meet the requirements of an infant, but do not demonstrably exceed these requirements. It is believed that such proteinaceous compositions and formulas can promote balanced brain development in the infant.

Thus, one aspect of the present invention provides a proteinaceous composition comprising (a) 2.8-4.3 g phenylalanine per 100 g protein and/or comprising (b) a weight ratio of phenylalanine to the sum of the large neutral amino acids isoleucine, leucine, valine, tryptophan, tyrosine, and methionine, which are all present in the proteinaceous composition, in the range of from 1:7.237 (0.138) to 1:10.810 (0.0925), further comprising tryptophan and/or threonine levels as defined here above, in terms of absolute numbers and/or expressed in terms of weight ratios compared to other amino acids including phenylalanine. Suitably the present invention provides a proteinaceous composition comprising (a), (b), and tryptophan and/or threonine levels as defined herein above.

Proteinaceous Compositions and Infant Formulas

The proteinaceous composition of the present invention may comprise intact proteins, hydrolysed proteins, protein fractions, free amino acids and/or a combination thereof.

The proteinaceous composition is suitably intended to be part of an infant formula or a follow-on formula, and is suitably intended for a human infant, most suitably a term human infant. Thus the present invention also provides an infant formula comprising the proteinaceous composition of the present invention.

The proteinaceous composition or formula of any aspect of the present invention may comprise a ratio of essential amino acids to non-essential amino acids of 40-60:40-60, suitably 45-55:45-55, even more suitably 48-52:48-52.

Formula

Another aspect of the present invention provides a formula comprising a proteinaceous composition, wherein the formula:
a) comprises 2.8-4.3 g phenylalanine per 100 g protein;
b) comprises 39-46 mg phenylalanine per 100 mL formula;
c) provides, or is formulated to provide phenylalanine in an amount of 58-70 mg/kg body weight per day; and/or
d) comprises a weight ratio of phenylalanine to the sum of isoleucine, leucine, valine, tryptophan, tyrosine, and methionine of from 1:7.237 (0.138) to 1:10.810 (0.0925), preferably of from 1:7.6 (0.132) to 1:10.2 (0.098).

In an exemplary embodiment, the formula complies with at least (a). In a preferred embodiment the formula complies with at least both (a) and (b), with at least both (a) and (c), at least both (a) and (d), or with at least both (a), (b) and (c) or (a), (c) and (d). In another embodiment, the formula comprises (a), (b), (c) and (d).

Preferably, the formula comprises 39-45 mg phenylalanine per 100 mL formula, more preferably 40-43 mg phenylalanine per 100 mL formula, most preferably 40-42 mg phenylalanine per 100 mL formula.

Preferably, the formula provides, or is formulated to provide phenylalanine in an amount of 58-69 mg/kg body weight/day, more preferably in an amount of 58-67 mg/kg body weight/day, most preferably in an amount of 59-65 mg/kg body weight/day.

In a preferred embodiment, the formula comprises a ratio of phenylalanine to threonine and/or an amount of threonine as described with regard to the proteinaceous composition here above.

Suitably, the formula comprises threonine in an amount from 45-52 mg/100 mL formula, more suitably in an amount from 45-50 mg/100 mL formula, most suitably in an amount from 45-47 mg/100 mL formula. Suitably, the formula provides or is formulated to provide threonine for every kilogram of body weight of the infant each day in an amount from 68-82 mg, more suitably 68-78 mg, even more suitably in an amount from 68-75 mg, most suitably in an amount of 70-75 mg per kg bodyweight per day.

In a preferred embodiment, the formula comprises a ratio of tryptophan to other LNAAs and/or an amount of tryptophan expressed in terms of the proteinaceous composition here above.

Suitably, the formula comprises tryptophan in an amount from 10-12 mg/100 mL formula, more suitably in an amount from 10-11 mg/100 mL formula, most suitably in an amount of 10-10.5 mg/100 mL formula. Suitably, the formula provides or is formulated to provide tryptophan for every kilogram of body weight of the infant each day in an amount from 15-18 mg, more suitably in an amount from 15-17 mg, most suitably in an amount from 15-16 mg.

Suitably, the formula comprises the sum of phenylalanine and tyrosine in an amount from 93-123 mg/100 mL formula, more suitably in an amount of 98-118 mg/100 mL formula, even more suitably in an amount of 103-113 mg/100 mL formula, most suitably in an amount of 108 mg/100 mL formula. Suitably, the formula provides or is formulated to provide the sum of phenylalanine and tyrosine for every kilogram of body weight of the infant each day in an amount from 152-172 mg, more suitably from 157-167 mg, even more suitably in an amount from 160-164 mg, most suitably in an amount of 162 mg per kg bodyweight per day.

The proteinaceous composition or formula of any aspect of the present invention may be intended as a complete nutrition for infants. Suitably, the formula of any aspect of the present invention is intended for a term infant. Suitably, the formula of any aspect of the present invention is intended for a human infant. More suitably, the formula of any aspect of the present invention is intended for a human term infant. In the context of the invention, a "human term infant" is a human infant born after 37 weeks of gestation, preferably between 37-42 weeks of gestation.

The formula of the present invention may comprise an enteral composition, i.e., any composition that is enterally administered, such as orally. As used in this document, the term "enteral" is intended to refer to the delivery directly into the gastrointestinal tract of a subject (e.g., orally or via a tube, catheter or stoma).

The formula of the present invention may be in a form suitable for administration to an infant or in a form suitable for administration to an infant after admixing with an aqueous liquid. In some embodiments, the formula may be formulated for administration in a liquid form. In some embodiments, the formula may comprise a powder suitable for making a liquid composition after reconstitution with an aqueous solution, such as with water. The formula may be made up as a packaged powder composition wherein the package is provided with instructions to admix the powder with a suitable amount of aqueous solution, thereby resulting in a liquid composition. In some other embodiments, the formula may comprise a ready-to-use liquid food (e.g., is in a ready-to-feed liquid form). A packed ready-to-use liquid food may involve fewer steps for preparation than a powder to be reconstituted and hence may involve a reduced chance on contamination by harmful micro-organisms.

The formula of the present invention may comprise an infant formula or a follow-on formula. An infant formula is typically intended for infants from the age of 0 to 6 months, although it can also be used to describe an infant formula intended for infants from the age of 0 to 12 months. A follow-on formula is typically intended for infants aged 6 to 12 months. Accordingly, the term "formula" and "infant formula" as used herein refers to a formula intended for an infant aged 0 to 12 months, more suitably 0 to 6 months. Suitably, the infant is a human infant. Suitably, the formula does not comprise or consist of human breast milk.

The formula may comprise a low level of protein, wherein a "low level" refers to a protein intake level of 0.9 to 1.4 g of protein per 100 mL of infant formula. A protein intake level of 0.9 to 1.4 g of protein per 100 mL of infant formula correlates to 1.4 to 2.1 g of protein per 100 kcal of infant formula, based on an energy level of 66 kcal per 100 mL. The formula may therefore comprise of 0.9 to 1.4 g of protein per 100 mL of infant formula (1.4-2.1 g of protein per 100 kcal), suitably 0.9-1.3 g of protein per 100 mL of infant formula (1.2-2.0 g of protein per 100 kcal), more suitably 0.9-1.2 g of protein per 100 mL of infant formula (1.4-1.8 g of protein per 100 kcal), even more suitably 0.9-1.15 g of protein per 100 mL of infant formula (1.4-1.7 g of protein per 100 kcal), yet even more suitably 0.95-1.1 g of protein per 100 mL of infant formula (1.4-1.7 g of protein per 100 kcal), most suitably 0.95-1.05 g of protein per 100 mL of infant formula (1.4-1.6 g of protein per 100 kcal).

The formula may further comprise a lipid, a carbohydrate, a vitamin and/or a mineral. In some embodiments, the formula may comprise between 5 and 50 en % lipid, between 5 and 50 en % protein, between 15 and 90 en % carbohydrate. Suitably, the formula may comprise between 35 and 50 en % lipid, between 7.5 and 12.5 en % protein and between 35 and 80 en % carbohydrate (en % is short for energy percentage and represents the relative amount each constituent contributes to the total caloric value of the preparation).

The formula may further comprise a non-digestible oligosaccharide. Suitably, the non-digestible oligosaccharide may be selected from the group consisting of galacto-oligosaccharides, fructo-oligosaccharides and acidic oligosaccharides. Such oligosaccharides are well known to those skilled in the art.

The formula may further comprise a polyunsaturated fatty acid (PUFA). Suitably, the PUFA may be selected from the group consisting of alpha-linolenic acid (ALA), linoleic acid (LA), eicosapentaenoic acid (EPA), docosahexaenoic acid (DHA), arachidonic acid (ARA), and docosapentaenoic acid (DPA). Suitably, the PUFA may be a long chain polyunsaturated fatty acid (LCPUFA) (e.g., EPA, DHA, ARA, DPA). Such PUFAs are well known to those skilled in the art.

The formula may further comprise a probiotic. Suitable probiotics are well known to those skilled in the art. The probiotic may comprise a lactic acid producing bacterium. The probiotic may comprise a *Lactobacillus* species. The probiotic may comprise a *Lactobacillus rhamnosus* strain (including *L. rhamnosus* GG, also referred to as "LGG"), a *Lactobacillus salivarius* strain, a *Lactobacillus casei* strain, a *Lactobacillus paracasei* strain (including *L. paracasei* F19), a *Lactobacillus acidophilus* strain, a *Lactobacillus reuteri* strain, and/or a *Lactobacillus helveticus* strain. The probiotic may comprise a *Bifidobacterium* species. The probiotic may comprise a *Bifidobacterium longum* strain, a *Bifidobacterium infantis* strain, a *Bifidobacterium breve* strain (including *B. breve* M-16V and *B. breve* BbC50), a *Bifidobacterium animalis* strain (including *B. animalis* subsp. *lactis*, including subsp. *lactis* BB-12 and subsp. *lactis* Bi-07), and/or a *Bifidobacterium bifidum* strain. In some embodiments, the probiotic may be viable or non-viable. As used herein, the term "viable", refers to live microorganisms. The term "non-viable" or "non-viable probiotic" means non-living probiotic microorganisms, their cellular components and metabolites thereof. Such non-viable probiotics may have been heat-killed or otherwise inactivated but retain the ability to favourably influence the health of the host. The probiotics may be naturally-occurring, synthetic or developed through the genetic manipulation of organisms, whether such new source is now known or later developed. Suitably, the formula does not comprise *Saccharomyces cerevisiae*.

The formula may comprise a fermented or a non-fermented composition. Fermentation by micro-organisms results in a lowering of the pH. As a non-fermented composition, the formula may have a pH above 5.5, such as 6.0, such as 6.5 (for example, in order to reduce damage to teeth). The pH may suitably be between 6 and 8.

The formula may be formulated to reduce stool irregularities (e.g., hard stools, insufficient stool volume, diarrhoea), which is a major problem in many babies. The formula may be administered in the form of a liquid formula which has an osmolality between 50 and 500 mθsm/kg, such as between 100 and 400 mθsm/kg.

The formula may be administered in the form of a liquid formula with a viscosity between 1 and 60 mPa·s, such as between 1 and 20 mPa·s, such as between 1 and 10 mPa·s, such as between 1 and 6 mPa·s. The low viscosity ensures a proper administration of the liquid, e.g., a proper passage through the hole of a nipple in a nursing bottle. Also, this viscosity closely resembles the viscosity of human milk. Furthermore, a low viscosity results in a normal gastric emptying and a better energy intake, which is essential for infants that need the energy for optimal growth and development. The viscosity of the liquid may be determined using a Physica Rheometer MCR 300 (Physica Messtechnik GmbH, Ostfilden, Germany) at shear rate of 95 $s^{-1}$ at 20° C.

The formula may be formulated so that it does not have an excessive caloric density. Hence, the formula (in liquid form) may have a caloric density between 0.1 and 2.5 kcal/mL, such as a caloric density of between 0.4 and 1.2 kcal/mL, such as between 0.55 and 0.75 kcal/mL.

The formula may have a long shelf life. For example, it may be shelf stable at ambient temperature for at least 6 months, such as least 12 months, where it is in a liquid, ready-to-feed form or where it is in a powder form.

Proteinaceous Composition—Sources

The proteinaceous compositions of the present invention may comprise an intact protein, a hydrolysed protein, a protein fraction, a free amino acid and/or a combination thereof, such that the proteinaceous composition comprises the amino acid profile of any aspect of the present invention.

The term "an intact protein" as used herein refers to any form of intact protein, including but not limited to a protein concentrate and/or a protein isolate, as well as other forms of intact proteins.

The term "hydrolysed protein" as used herein refers to partially and/or extensively hydrolysed proteins. Suitably the proteinaceous composition of the present invention comprises a hydrolysed protein with a degree of hydrolysis of between 5% and 25%, more suitably between 7.5% and 21%, most suitably between 10% and 20%. The degree of hydrolysis is defined as the percentage of peptide bonds which have been broken by enzymatic hydrolysis, with 100% being the total potential peptide bonds present. A suitable method for preparing a protein hydrolysate is described in WO 2001/041581, the entire contents of which is incorporated herein by reference. The use of these proteins may reduce the allergic reactions of an infant.

The proteinaceous composition may comprise any suitable intact protein, hydrolysed protein, protein fraction, free amino acid and/or a combination thereof, which is selected such that the requirements for the amino acid profile of the proteinaceous composition as defined herein are met. For instance, as discussed elsewhere, the present inventors have demonstrated the desirability of lowering the levels of phenylalanine, and optionally tryptophan and threonine relative to those found in human milk and/or commercially available formulas, and/or to provide a weight ratio between phenylalanine and the sum of leucine, isoleucine, tyrosine, methionine, tryptophan and valine that is different to that found in human milk and/or commercially available formulas. Other considerations known to those skilled in the art should be taken into account in selecting a suitable proteinaceous composition. For instance, some protein sources exhibit a high level of variation between batches of the protein, which may be due to genetic background of the source of the protein and also seasonal variation. Furthermore, a proteinaceous composition produced by fermentation with some microorganisms may be not suitable if the fermenting microorganisms are still present in the composition and are deemed undesirable for the purpose of the composition. Such selection considerations will be well known to those skilled in the art.

In some embodiments, the proteinaceous composition comprises an intact protein, and a free amino acid. In some embodiments, the proteinaceous composition comprises a hydrolysed protein and/or a protein fraction, and a free amino acid. In some embodiments, the proteinaceous composition comprises free amino acids. In some embodiments, the proteinaceous composition consists essentially of or consists of free amino acids.

The proteinaceous composition may comprise a non-human animal protein (such as milk proteins, including caseins and whey proteins, meat proteins and egg proteins), a non-animal protein, a dairy protein, a non-cow dairy protein, a non-dairy protein, a vegetable protein, an algal protein, a hydrolysate of any of these proteins, a fraction of any of these proteins, a free amino acid, and/or a combination of any of these amino acid sources.

In some embodiments, the proteinaceous composition comprises an animal protein and a non-animal protein, and optionally a free amino acid. The animal protein and/or the non-animal protein may comprise an intact protein, a protein hydrolysate, or a protein fraction. Suitably, the proteinaceous composition comprises a dairy protein and a non-animal protein, and optionally a free amino acid. The proteinaceous composition may comprise a dairy protein and a vegetable protein, and optionally a free amino acid. The dairy protein and/or the vegetable protein may comprise an intact protein, a protein hydrolysate, or a protein fraction. The proteinaceous composition may comprise a dairy protein and an algal protein, and optionally a free amino acid. The dairy protein and/or the algal protein may comprise an intact protein, a protein hydrolysate, or a protein fraction. The proteinaceous composition may comprise a non-cow dairy protein and a vegetable protein, and optionally a free amino acid. The non-cow dairy protein and/or the vegetable protein may comprise an intact protein, a protein hydrolysate, or a protein fraction. The proteinaceous composition may comprise a non-cow dairy protein and an algal protein, and optionally a free amino acid. The non-cow dairy protein and/or the algal protein may comprise an intact protein, a protein hydrolysate, or a protein fraction.

In some embodiments, the proteinaceous composition does not comprise an animal-milk-derived (e.g., dairy) protein. More suitably, the proteinaceous composition does not comprise a cow-derived protein (e.g., cow's milk protein) and/or does not comprise a goat-derived protein (e.g., goat's milk protein). In some embodiments, the proteinaceous composition does not comprise only (e.g., consist of) acid whey. More suitably, the proteinaceous composition does not comprise acid whey. In some embodiments, the proteinaceous composition does not comprise only (e.g., consist of) alpha-lactalbumin. More suitably, the proteinaceous composition does not comprise alpha-lactalbumin.

In some embodiments, the proteinaceous composition does not comprise a soy protein.

Suitably, the proteinaceous composition comprises at least 40%, 50%, 60%, 70%, 80%, 90%, or 95% (or any integer in-between) of amino acid sources comprising an intact protein, a hydrolysed protein, a protein fraction, such that the proteinaceous composition comprises less than 5%, 10%, 20%, 30%, 40%, 50%, or 60% (or any integer in-between) of a free amino acid. Most suitably, the proteinaceous composition comprises at least 60% of amino acid sources comprising an intact protein, a hydrolysed protein, a protein fraction, such that the proteinaceous composition comprises 40% or less of a free amino acid.

Reference throughout this document (both specification and claims) is made to weight units (milligrams or grams) of amino acids. Where expressed per weight unit of protein (e.g., per 100 g protein), it should be noted that this expression refers to the relative weight of the amino acid(s) in terms of the protein weight, where the protein weight means the weight of all proteinaceous matter.

Furthermore, where reference throughout this document (both specification and claims) is made to weight units (milligrams or grams) of amino acids, it should be noted that these units are protein equivalent weights of amino acids (i.e., the weight of amino acid when present in a protein). Thus, where a free amino acid is employed in the present invention, the dehydration synthesis reactions which occur when a protein is formed from free amino acids must be taken into account. Accordingly, if a free amino acid is employed in the present invention, the weight of the free amino acid that is required is 17% higher than the protein equivalent weight (as expressed herein). To illustrate, if a proteinaceous composition of the present invention as referred to herein requires 15 mg of tryptophan, this refers to 15 mg of tryptophan when present in a protein, and will be met with 17.55 mg of tryptophan in free amino acid form. Such calculations and conversions are well known to those skilled in the art.

Suitable amino acid sources for the proteinaceous composition may include, but are not limited to, cow's milk protein, whey (including acid whey, sweet whey, and alpha-lactalbumin enriched whey), alpha-lactalbumin, beta-lactoglobulin, glycomacropeptide, casein (including beta-casein), skim milk, lactoferrin, colostrum, goat's milk protein, donkey's milk protein, buffalo milk protein, fish, chicken protein, pork protein, soy protein (including soy protein isolate), pea protein (including pea protein isolate), wheat protein, rice protein, rice bran, potato protein (including potato protein isolate), another plant protein, fractions of any of these proteins, hydrolysates of any of these proteins, and free amino acids (including amino acids isolated from an amino acid source and/or amino acids that have been chemically or synthetically produced).

The amino acid sources may be commercially available sources (e.g., Soy ProtYield).

The amino acid profile of the proteinaceous compositions of the present invention, as described herein, refers to one or more essential amino acids (or conditionally essential amino acids in some instances). It will be recognised by those skilled in the art that the proteinaceous composition will also comprise non-essential amino acids. Suitably, the proteinaceous composition or formula of the present invention comprises a ratio of essential amino acids to non-essential amino acids of 40-60:40-60, suitably 45-55:45-55, even more suitably 48-52:48-52. This is in line with the typical ratio of essential amino acids in human milk and commercially available formulas, thus it is noted that the in these suitable embodiments, and in particular where the lowering of specific essential amino acids (e.g., threonine and tryptophan) has been shown to be desirable, the present invention does not contemplate a lowering of the essential amino acids relative to the non-essential amino acids.

Balanced Growth and/or Development

As described herein, the present inventors have developed optimised proteinaceous compositions and formulations which promote balanced growth and/or development in an infant, and/or prevent or reduce the risk of unbalanced growth and/or development in an infant.

Accordingly, the present invention provides a formula as defined herein for use in promoting, assisting or achieving balanced growth or development in an infant. Also provided is the use of a composition in the manufacture of a formula as defined herein for promoting, assisting or achieving balanced growth or development in an infant. Also provided is a method for promoting, assisting or achieving balanced growth or development in an infant, wherein the method comprises administering to the infant a formula as defined herein.

As another aspect of the present invention, there is provided a formula as defined herein for use in preventing or reducing the risk of unbalanced growth or development in an infant. Also provided is the use of a composition in the manufacture of a formula as defined herein for preventing or reducing the risk of unbalanced growth or development in an infant. Also provided is a method for preventing or reducing the risk of unbalanced growth or development in an infant, wherein the method comprises administering to the infant a formula as defined herein.

The term "balanced" as used in the phrase "balanced growth and/or development" is intended to refer to healthy or normal growth and/or development of an infant. For example, the growth and/or development is not too low/little or too high/much ("unbalanced growth and/or development"), for instance growth velocity is within normal ranges, weight gain is allocated normally and is associated with a normal, healthy (organ) development. This may be with reference to published figures that define the healthy or normal growth and/or development of an infant with reference to a population (geographic, demographic, ethnic, etc) within which the infant belongs, or with reference to the growth and/or development an unhealthy infant or group of unhealthy infants. Examples of published references include the WHO growth curve (WHO, 2006).

The term "growth and/or development" as used herein may refer to growth and/or development of the brain of an infant and/or the cognitive function of the infant, as further defined below, and/or to growth and/or development of the body of an infant and/or the infant's body composition, also as further defined below.

Brain and Cognitive Function

Balanced growth and/or development may refer to the balanced growth and/or development of the brain of an infant and/or the cognitive function of the infant. This may refer to physical development of the brain, including neurotransmitter activity and also brain or head circumference. This may also refer to any brain function or behaviour observed in the infant or later in the life of the infant, such as mood, appetite, sleep, memory, learning, and some social behaviours of the infant. It may also refer to preventing or reducing the infant's risk for developing a psychiatric disease in later life (e.g., an affective disorder, depression, schizophrenia).

As described herein, the recommended intakes determined for the essential amino acids that are associated with brain function, such as phenylalanine, tryptophan and threonine, were found to be different to those found in commercially available formulas and in human milk. Furthermore, the ratio between the neutral amino acids tryptophan, valine, leucine, isoleucine, tyrosine, and methionine and phenylalanine was also found to be significantly different to the recommended ratio, wherein it has been stated that an altered ratio might have possible implications on brain development. It is therefore believed that formulas that comprise the optimal amino acid profile as herein defined advantageously promote, assist, or achieve balanced growth or development of brain and cognitive function in infants.

Accordingly, the present invention contemplates a formula as defined herein for use in promoting, assisting or achieving balanced growth or development of the brain of an infant. Also provided is the use of a composition in the manufacture of a formula as defined herein for promoting, assisting or achieving balanced growth or development of the brain of an infant. Also provided is a method for promoting, assisting or achieving balanced growth or development of the brain of an infant, wherein the method comprises administering to the infant a formula as defined herein.

As another aspect of the present invention, there is provided a formula as defined herein for use in preventing or reducing the risk of unbalanced growth or development of the brain of an infant. Also provided is the use of a composition in the manufacture of a formula as defined herein for preventing or reducing the risk of unbalanced growth or development of the brain of an infant. Also provided is a method for preventing or reducing the risk of unbalanced growth or development of the brain of an infant, wherein the method comprises administering to the infant a formula as defined herein.

Body Growth, Development and Composition

Balanced growth and/or development may refer to the balanced growth and/or development of the body of an infant and/or the infant's body composition. This may refer to the height, weight, fat distribution (e.g., visceral fat versus subcutaneous fat), or other parameter of the infant, such parameters being well known to those skilled in the art.

In the studies performed on human infants described herein, the recommended intakes determined for the essential amino acids that are associated with body growth and body function (including insulin sensitivity), such as tryptophan, were found to be different to those found in commercially available formulas and in human milk. Furthermore, in the piglet growth studies performed, the growth rate of the piglets ingesting the optimised amino acid profile including reduced phenylalanine levels was higher compared to those ingesting the non-adjusted amino acid profile with the same protein level including higher phenylalanine levels. It is therefore believed that formulas according to the invention as herein defined advantageously promote, assist, or achieve balanced growth or development of body and body composition in infants.

Accordingly, the present invention contemplates a formula as defined herein for use in promoting, assisting or achieving balanced growth or development of the body of an infant. Also provided is the use of a composition in the manufacture of a formula as defined herein for promoting, assisting or achieving balanced growth or development of the body of an infant. Also provided is a method for promoting, assisting or achieving balanced growth or development of the body of an infant, wherein the method comprises administering to the infant a formula as defined herein.

As another aspect of the present invention, there is provided a formula as defined herein for use in preventing or reducing the risk of unbalanced growth or development of the body of an infant. Also provided is the use of a composition in the manufacture of a formula as defined herein for preventing or reducing the risk of unbalanced growth or development of the body of an infant. Also provided is a method for preventing or reducing the risk of unbalanced growth or development of the body of an infant, wherein the method comprises administering to the infant a formula as defined herein.

In these aspects, the formula suitably comprises a low level of protein, wherein a "low level" refers to a protein intake level of 0.9 to 1.4 g of protein per 100 mL of infant formula. A protein intake level of 0.9 to 1.4 g of protein per 100 mL of infant formula correlates to 1.4 to 2.1 g of protein per 100 kcal of infant formula, based on an energy level of 66 kcal per 100 mL. More suitably, the formula of the embodiments above comprises 0.9-1.3 g of protein per 100 mL of infant formula (1.2-2.0 g of protein per 100 kcal), even more suitably 0.9-1.2 g of protein per 100 mL of infant formula (1.4-1.8 g of protein per 100 kcal), even more suitably 0.9-1.15 g of protein per 100 mL of infant formula (1.4-1.7 g of protein per 100 kcal), yet even more suitably 0.95-1.1 g of protein per 100 mL of infant formula (1.4-1.7 g of protein per 100 kcal), most suitably 0.95-1.05 g of protein per 100 mL of infant formula (1.4-1.6 g of protein per 100 kcal).

Obesity Later in Life

It is known that lowering protein levels below the minimal requirements for growth may lead to compensatory intake of formula to meet protein requirements and thus pose a risk of overconsumption of energy from fats and carbohydrates (Formon, 1999). Therefore, although it has been previously proposed that infant formulas containing low protein may reduce the risk of development of obesity in the infant at a later stage of life (Koletzko, 2009), it is now apparent that it is also the protein quality, and not only the protein quantity, that needs to be optimised in order to satisfactorily reduce the risk of obesity in the infant at a later stage of life.

In the growth studies described herein, it was observed that the growth rate of the piglets ingesting the optimised amino acid profile was higher compared to those ingesting the non-adjusted amino acid profile of the same total protein level. This indicates that the optimised amino acid profile better meets the requirement for growth and can be implemented in combination with lowered protein levels. In other words, the optimised amino acid profile can facilitate the reduction of protein levels in existing formulae. Such a concept of improved protein quality and lowered protein quality might reduce the risk of development of obesity. Therefore it is proposed that formulations can be produced with lowered levels of total protein but with optimal amino acid profiles as defined herein, thus meeting the needs of infants and therefore promoting balanced growth and/or development in infants while preventing or reducing the risk of obesity in the infant at a later stage of life, and also to prevent or reduce the risk of obesity-related diseases and conditions such as metabolic diseases (e.g., metabolic syndrome, diabetes), and cardiovascular disease.

According to another aspect, there is provided a formula as defined herein for use in preventing or reducing the risk of obesity later in life in an infant. Also provided is the use of a composition in the manufacture of a formula as defined herein for preventing or reducing the risk of obesity later in life in an infant. Also provided is a method for preventing or reducing the risk of obesity later in life in an infant, wherein the method comprises administering to the infant a formula as defined herein.

With "later in life" is meant an age exceeding the age at which the infant receives the formula, suitably exceeding the age by at least 12 months, more suitably by 24 months, by 36 months, by 5 years, by 6 years, most suitably by 8 years. Suitably, "later in life" means at toddler age, childhood age, adolescence age, or adult age. For instance, "later in life" may refer to 3, 4, 5, 6, 7, 8, 9, 10, 11, 12, 13, 14, 15, 16, 17, 18, 19, 20 years of age, or >20 years of age.

The phrase "preventing or reducing the risk of obesity" is herein defined to be a prophylactic treatment of an infant, including but not limited to preventing the development of obesity in the infant later in life, preventing the development of an obesity-related diseases or conditions later in life (e.g., a metabolic disease, metabolic syndrome, diabetes, cardiovascular disease), reducing (e.g., altering) the likelihood of the development of obesity later in life, and/or reducing (e.g., altering) the likelihood of the development of an obesity-related disease or condition later in life.

In these aspects, the formula suitably comprises a low level of protein, wherein a "low level" refers to a protein intake level of 0.9 to 1.4 g of protein per 100 mL of infant formula. A protein intake level of 0.9 to 1.4 g of protein per 100 mL of infant formula correlates to 1.4 to 2.1 g of protein per 100 kcal of infant formula, based on an energy level of 66 kcal per 100 mL. More suitably, the formula of the embodiments above comprises 0.9-1.3 g of protein per 100 mL of infant formula (1.2-2.0 g of protein per 100 kcal), even more suitably 0.9-1.2 g of protein per 100 mL of infant formula (1.4-1.8 g of protein per 100 kcal), even more suitably 0.9-1.15 g of protein per 100 mL of infant formula (1.4-1.7 g of protein per 100 kcal), yet even more suitably 0.95-1.1 g of protein per 100 mL of infant formula (1.4-1.7 g of protein per 100 kcal), most suitably 0.95-1.05 g of protein per 100 mL of infant formula (1.4-1.6 g of protein per 100 kcal).

Administration

Provided herein is a method for providing nutrition to an infant, the method comprising administering to the infant a proteinaceous composition or a formula of the present invention. Suitably, the infant is a human infant as described above.

The method preferably comprising the steps a) admixing i) a nutritionally or pharmaceutically acceptable liquid (e.g., water); and ii) a dry composition, wherein the dry composition comprises the proteinaceous composition or formula of the present invention, and step b) administering the liquid composition obtained in step a) to an infant.

EXAMPLES

Example 1: Amino Acid Requirements in Infants

Example 1 describes the determination of some essential amino acid requirements in infants by way of the indicator amino acid oxidation (IAAO) method, and the subsequent definition of the recommended ranges of dietary requirements for these essential amino acids. The infants all had a gestational age of 37-42 weeks, a birth weight of more than 2500 grams and a postnatal age of <28 days, and exhibited a weight gain rate of >5 g·kg$^{-1}$·d$^{-1}$ in the preceding 5 days (this weight gain rate is an indication of good health).

IAAO Method

In the IAAO method, each infant was fed an amino acid based formula where each essential amino acid was present in excess except the essential amino acid to be tested. The infant was randomly assigned to receive the test amino acid in an amount ranging from deficient to excess (i.e., each infant was given one specific level of the test amino acid). Phenylalanine, labelled with a stable isotope, was used as the indicator amino acid for assessing threonine and tryptophan requirements, while isotope-labelled lysine was used as indicator amino acid for determining phenylalanine requirement.

The IAAO method (Zello, 1993) is based on the concept that when the test amino acid intake is insufficient to meet the infant's requirements, protein synthesis will be limited and all of the amino acids will be oxidised, including the indicator amino acid. Oxidation of the indicator amino acid can be measured in expired air as $^{13}CO_2$.

FIG. 1 shows an example of the graph plotted by the IAAO method for a test amino acid. As can be seen in FIG. 1, as the dietary intake of the test amino acid (shown on the x-axis) increases, protein synthesis increases and the oxidation rate of the indicator amino acid (shown on the y-axis) decreases until the requirement of the test amino acid is met (indicated as the breakpoint). Once the requirement of the test amino acid is met, a further increase in its intake will have no further influence on the oxidation rate of the indicator amino acid. Thus the breakpoint determines the dietary requirement of the test amino acid in this setting.

IAAO Method—Protocol 24 hours before the study day, the infants consumed their test formula (including the specific level of the test amino acid being given for each particular infant) for adaptation, with the feeding regime conforming to that of the hospital. During the study day, the feeding regime was changed to hourly bolus feeding of the infant's test formula to ensure a metabolic steady state in feed condition. In order to quantify individual $CO_2$ production, the infants received a primed (14 µmol/kg) continuous (9 µmol/kg/h) infusion of [$^{13}C$]bicarbonate (sterile pyrogen free, 99% $^{13}C$ APE; Cambridge Isotopes, Woburn, Mass.) for 3 hours (Riedijk, 2005). In the case of tryptophan and threonine, directly following the 3 hour bicarbonate infusion, a primed (34 µmol/kg) continuous (27 µmol/kg/h) enteral infusion of L-[1-$^{13}C$]phenylalanine (99% $^{13}C$ APE; Cambridge Isotopes) was given for 4 hours. To minimise invasiveness the tracers were given enterally by means of a gastric tube. For establishing the breakpoint for phenylalanine, an excess of tyrosine (166 mg/kg/d) was used, and [1-$^{13}C$]lysine 2HCl served as indicator amino acid.

Breath samples were collected by means of the direct sampling method described by van der Schoor (2004). At baseline, two duplicate breath samples were obtained before tracer infusion. During the last 45 minutes of [$^{13}C$]bicarbonate infusion, and during the last hour of L[1-$^{13}C$]phenylalanine infusion (or [1-$^{13}C$]lysine 2HCl infusion where phenylalanine was the test amino acid), duplicated samples were collected every ten and fifteen minutes, respectively. Samples were stored at room temperature until monthly shipment to the Netherlands for analysis at the mass spectrometry laboratory of the Erasmus Medical Center, Rotterdam. Expired $^{13}CO_2$ enrichment was measured by isotope mass spectrometry (ABCA; Europe Scientific, van Loenen Instruments, Leiden, the Netherlands), and reported in units of atom percent excess (APE).

For each participant, the estimated body $CO_2$ production was calculated, as described previously (Riedijk, 2005). For threonine and tryptophan, the rate of fractional [1-$^{13}C$] phenylalanine oxidation was calculated using this equation:

$$\text{Fractional phenylalanine oxidation (\%)} = [IE_{PHE} \times i_B]/[i_{PHE} \times IE_B] \times 100\%,$$

where $IE_{PHE}$ is the excess $^{13}C$ isotopic enrichment in expired air during [1-$^{13}C$]phenylalanine infusion (APE), $i_B$ is the infusion rate of [$^{13}C$]bicarbonate (µmol/kg/h), $i_{PHE}$ is the infusion rate of [1-$^{13}C$]phenylalanine (µmol/kg/h), and $IE_B$ is the excess $^{13}C$ isotopic enrichment in expired air during [$^{13}C$]bicarbonate infusion (van Goudoever, 1993). For phenylalanine, the above calculations are based on [1-$^{13}C$]lysine 2HCl.

Figure 2:
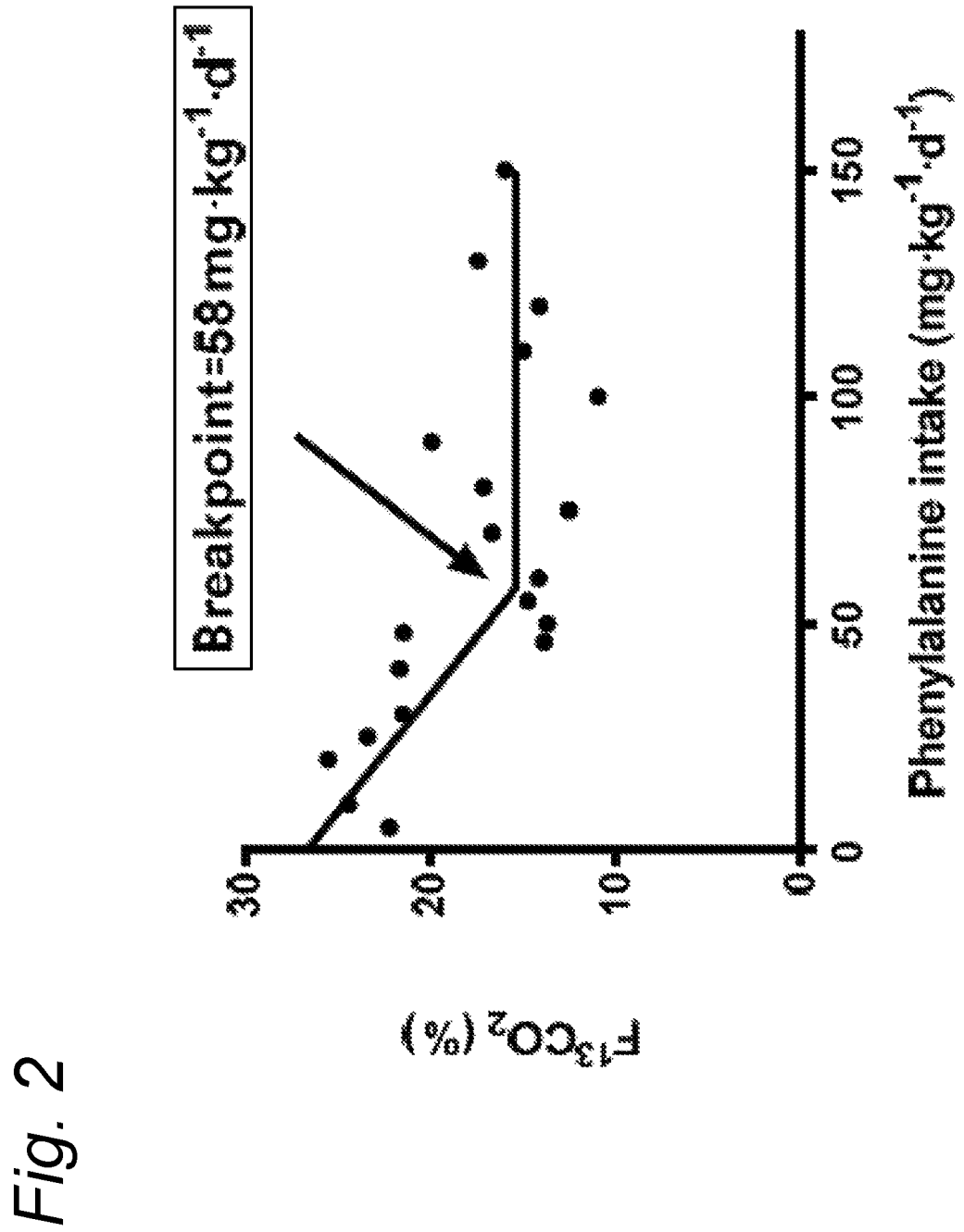
FIG. 2 shows the rates of release of $^{13}CO_2$ in the breath of 21 term infants ($F^{13}CO_2$) at different phenylalanine intakes as described in Example 1, and in particular Example 1a. Using a biphasic linear regression crossover model, the mean breakpoint was estimated to be 58 mg·kg$^{-1}$·d$^{-1}$ ($P<0.01$, $r^2=0.54$).
Figure 3:
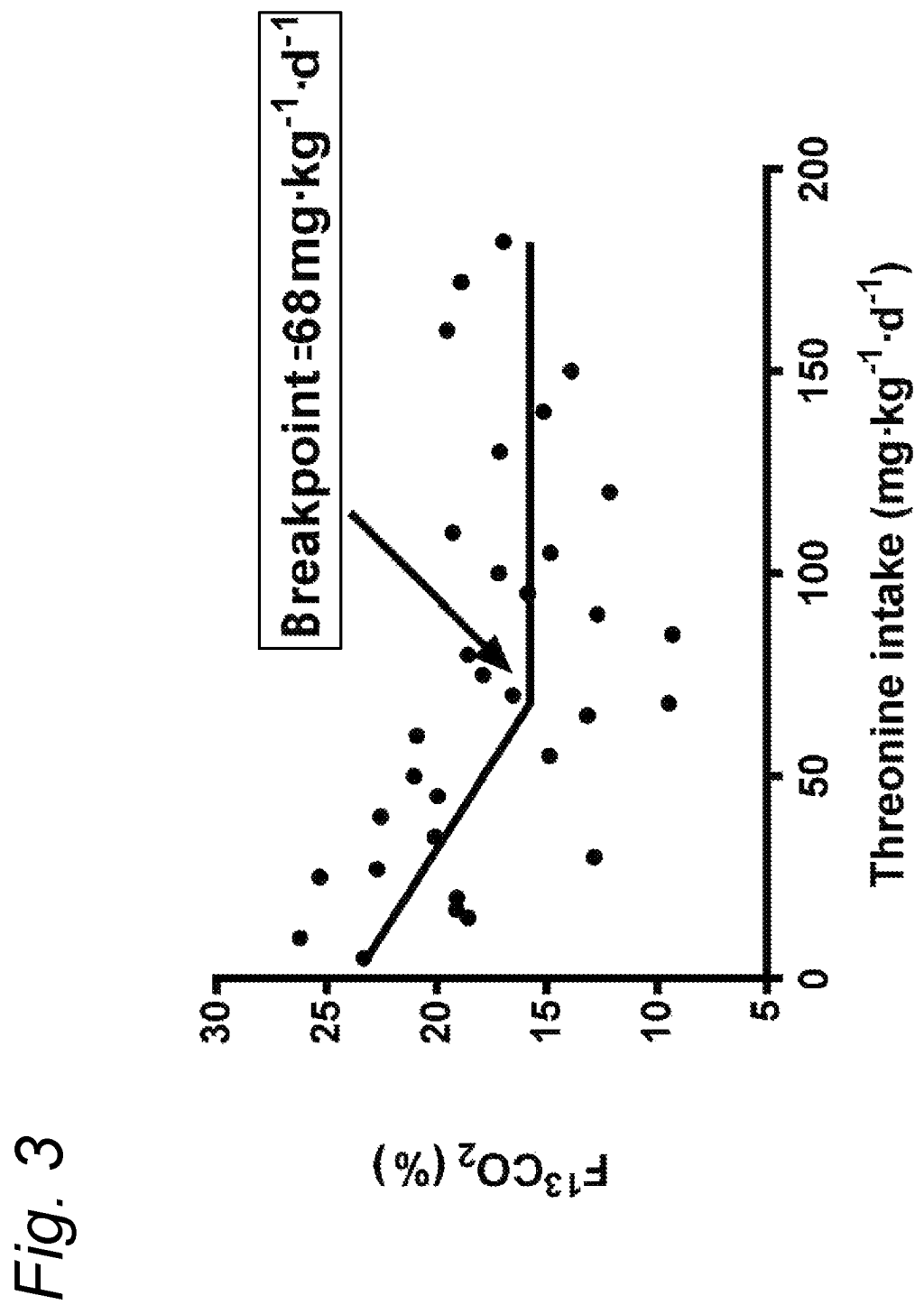
FIG. 3 shows the rates of release of $^{13}CO_2$ in the breath of 32 term infants ($F^{13}CO_2$) at different threonine intakes as described in Example 1b. Using a biphasic linear regression crossover model, the mean breakpoint was estimated to be 68 mg·kg$^{-1}$·d$^{-1}$ ($P<0.0001$, $r^2=0.362$).
Figure 4:
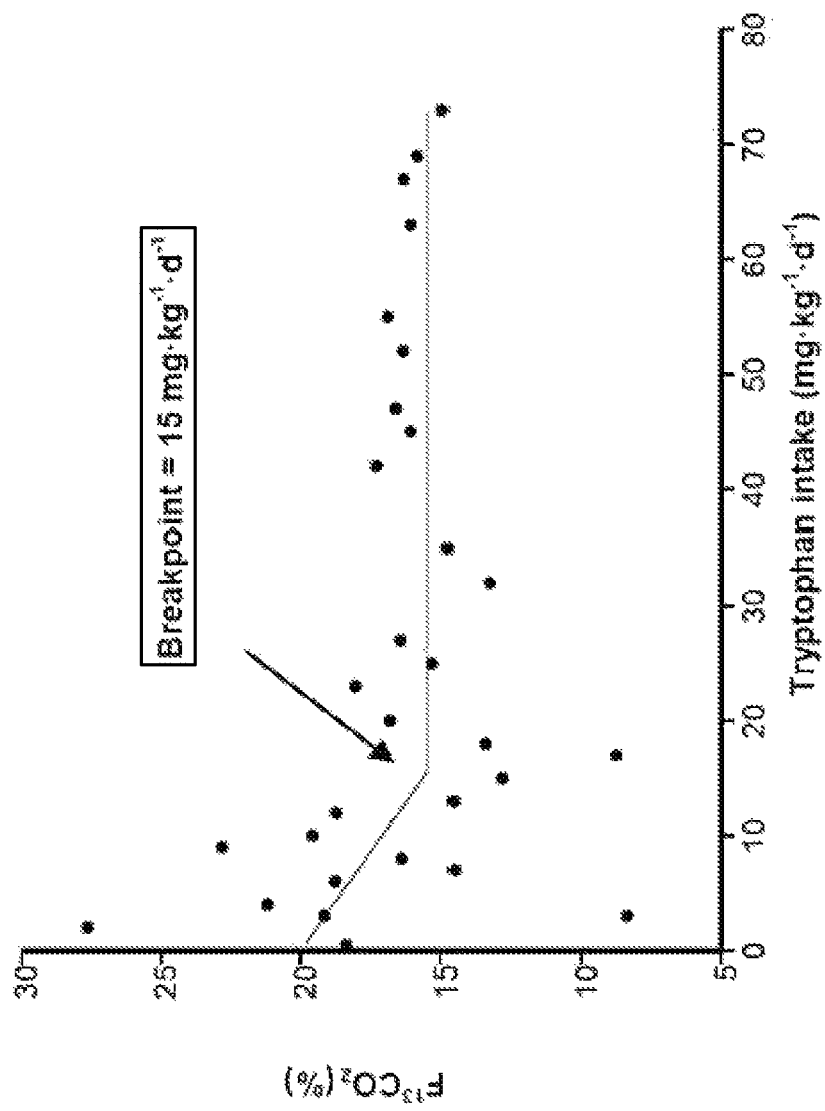
FIG. 4 shows the rates of release of $^{13}CO_2$ in the breath of 30 term infants ($F^{13}CO_2$) at different tryptophan intakes as described in Example 1c. Using a biphasic linear regression crossover model, the mean breakpoint was estimated to be 15 mg·kg$^{-1}$·d$^{-1}$ ($P<0.05$, $r^2=0.13$).

The results of the IAAO studies for amino acids phenylalanine, threonine, and tryptophan are described in Examples 1a-1c, and with the results also illustrated graphically in FIGS. 2-4. As phenylalanine was used as the indicator amino acid for threonine and tryptophan, FIGS. 3 and 4 plot the oxidation rates of the phenylalanine ($F^{13}CO_2$) against dietary intake of the test amino acid. In FIG. 2, it is the oxidation rate of [1-$^{13}C$]lysine 2HCl against dietary intake of the test amino acid (phenylalanine) that is plotted. Each point represents an individual infant who was fed an amino acid based formula where each essential amino acid was present in excess except the essential amino acid to be tested, where the test amino acid was present in an amount ranging from deficient to excess.

Recommended Dietary Intake Ranges

The recommended dietary intake range for the essential amino acids in each of Examples 1a-1c was then determined using the following strategy.

First, the dietary requirement (breakpoint) of the IAAO results was estimated using a biphasic linear regression crossover model and was taken as the primary parameter.

To ensure that nearly all individuals meet the amino acid requirements, a safe level of intake was defined. The safe level of protein intake proposed by the WHO (WHO/FAO/UNU, 2007) was used, defining the safe level of protein intake as 125% of the average protein requirement. In this instance, the safe level of amino acid intake was therefore calculated to be >125% of the primary parameter (breakpoint value) obtained as described above, to reach the population safe requirement value.

An assumption was made that this primary parameter (breakpoint value) is higher than the requirement of protein bound amino acids based on the study by Metges (Metges 2000) which showed >20% higher first pass oxidation rate when free amino acids are ingested compared to protein bound amino acids. Therefore 20% of the estimated requirement was subtracted from the population safe requirement value, which is believed to be conservative (i.e., an overestimate rather than underestimate).

The net effect of the above two calculations is therefore that the breakpoint equals the recommended intake (measured in $mg \cdot kg^{-1} \cdot d^{-1}$).

The recommended intake measured in $mg \cdot kg^{-1} \cdot d^{-1}$ was then converted to units of mg (of amino acid)/100 mL (of infant formula). This calculation was made by dividing the recommended intake ($mg \cdot kg^{-1} \cdot d^{-1}$) by the volume intake by an infant of 150 $mL \cdot kg^{-1} \cdot d^{-1}$ (Shaw, 2001) and multiplying by 100. This is described below as the recommended dietary intake for each amino acid, expressed in mg (amino acid)/100 mL (infant formula).

This recommended dietary intake range was also converted into units of g (amino acid)/100 g protein as follows. The calculations were based on a protein intake level of 0.9-1.4 g (protein)/100 mL (infant formula), or 900-1,400 mg (protein)/100 mL (infant formula) (Koletzko, 2009). This protein intake level correlates to 1.4 to 2.1 g protein/100 kcal infant formula based on an energy level of 66 kcal per 100 mL. The recommended dietary intake for the amino acid expressed in mg/100 mL was therefore divided by the upper limit of protein intake level (1,400 mg/100 mL) and multiplied by 100 to reach the lower limit of the proposed interval. The recommended dietary intake for the amino acid expressed in mg/100 mL was also divided by the lower limit of protein intake level (900 mg/100 mL) and multiplied by 100 to reach the upper limit of the proposed interval.

Example 1a: Phenylalanine

Using the method described above, fully enterally fed neonates were randomly assigned to phenylalanine intakes ranging from 5 to 150 mg/kg/d. The breakpoint for phenylalanine by a group of 21 infants was estimated to be 58 $mg \cdot kg^{-1} \cdot d^{-1}$ (this is also shown in FIG. 2) and the recommended dietary intake for phenylalanine was then determined to be 39 mg/100 mL (of infant formula). Converted into g/100 g protein as described above, the result for phenylalanine is 2.8-4.3 g/100 g protein.

Example 1b: Threonine

Using the method described above, the breakpoint for threonine by a group of 32 infants was estimated to be 68 $mg \cdot kg^{-1} \cdot d^{-1}$ (this is also shown in FIG. 3) and the recommended dietary intake for threonine was then determined to be 45 mg/100 mL (of infant formula). Converted into g/100 g protein as described above, the result for threonine is 3.2-5.0 g/100 g protein.

Example 1c: Tryptophan

Using the method described above, the breakpoint for tryptophan by a group of 30 infants was estimated to be 15 $mg \cdot kg^{-1} \cdot d^{-1}$ (this is also shown in FIG. 4) and the recommended dietary intake for tryptophan was then determined to be 10 mg/100 mL (of infant formula). Converted into g/100 g protein as described above, the result for tryptophan is 0.7-1.1 g/100 g protein.

Example 1d: Other Amino Acids

The same IAAO methodology (and subsequent calculations) described above was used to determine the breakpoint for isoleucine, leucine, valine, and methionine. The results are summarised in Table 1 in Example 2.

The IAAO methodology cannot be used for the conditionally essential amino acid tyrosine. For tyrosine, the WHO recommendation for the total intake of aromatic amino acids (tyrosine and phenylalanine combined) was taken as starting point.

The WHO recommends a total intake of 162 mg/kg/day of aromatic amino acids (phenylalanine and tyrosine); the EC directive recommends a total of 157 mg/kg/d. Taking the WHO recommendation of 162 mg/kg/day, which corresponds to 108 mg/100 mL of total aromatic amino acids, the recommended dietary intake for tyrosine was then determined to be 70 mg/100 mL (taking into account rounding differences in the basic calculations).

Example 2: Amino Acid Profiles

Bringing together the results from Example 1, Table 1 below lists the recommended dietary intake range for the essential amino acids both in mg (amino acid)/100 mL (of infant formula), and in g (amino acid)/100 g protein. Also included in Table 1 are the preferred ratios of tryptophan or phenylalanine to the neutral amino acids but excluding themselves (e.g. ratio of tryptophan to valine, leucine, isoleucine, phenylalanine, tyrosine, and methionine, and ratio of phenylalanine to valine, leucine, isoleucine, tryptophan, tyrosine, and methionine) calculated based on the results in mg/100 mL, with a variation of 10% permitted in this ratio. Herein, it is preferred that the sum of phenylalanine and tyrosine present is at least 108 mg/100 mL.

TABLE 1

Recommended dietary intake range for each essential amino acid as determined in Example 1.

| Essential amino acid | mg kg$^{-1}$ day$^{-1}$ | mg/100 mL | g/100 g protein |
|---|---|---|---|
| Isoleucine | 105 | 70 | 5.0-7.8 |
| Leucine | 140 | 93 | 6.6-10.4 |
| Methionine | 38 | 25 | 1.8-2.8 |
| Phenylalanine | 58 | 39 | 2.8-4.3 |
| Tryptophan | 15 | 10 | 0.7-1.1 |
| Threonine | 68 | 45 | 3.2-5.0 |
| Tyrosine | N.D. | 70 | 5.0-7.8 |
| Valine | 110 | 73 | 5.2-8.1 |
| Phe:(Val + Leu + Ile + Trp + Tyr + Met) | | 1:7.237 (0.138)-1:10.810 (0.0925) | |
| Phe:Thr | | 1:0.959 (1.042)-1.433 (0.698) | |
| Trp:(Val + Leu + Ile + Phe + Tyr + Met) | | 1:30.327 (0.0330)-1:45.304 (0.0221) | |
| Protein (g/100 mL) | | 0.9-1.4 | |
| Protein (g/100 kcal) | | 1.4-2.1 | |

Through these experiments it has been surprisingly discovered that the levels of some essential amino acids required for protein synthesis (and therefore for growth and/or development) in term infants are met at intake levels where the intake levels differs distinctly from that found in human breast milk and in commercially available formulas for specific essential amino acids, where the combined profile of two or more of those intake levels differs distinctly from that found in human breast milk and in commercially available formulas for specific essential amino acids, and where the ratios between one or more amino acids differs distinctly from those found in human breast milk and in commercially available formulas.

The individual breakpoints for the essential amino acids that act as precursors for neurotransmitters in the brain, such as phenylalanine and tryptophan, are lower than the levels found in human breast milk and/or commercially available formulas.

Furthermore, the ratios of Phe:(Val+Leu+Ile+Trp+Tyr+Met) and optionally of Trp:(Val+Leu+Ile+Phe+Tyr+Met) may affect the bioavailability of Phe and Thr. These ratios were found to be lower compared to those found in human breast milk and/or commercially available formulas.

Example 3: Growth Studies

A piglet model to evaluate growth poses a beneficial way of detecting effects of altered amino acid compositions on growth, since the growth of pigs is faster than that of infants. Therefore the model provides an excellent model to study effects of protein quantity and quality on growth.

The objective of the piglet study was to determine whether an optimised amino acid composition, low protein formula diet is associated with altered growth rates in piglets compared to those observed in piglets fed a low protein diet with a non-adjusted amino acid composition.

Thirty-six piglets (age: 7 days) were separated from their mothers and housed individually in cages for 24 days. In the first four days, piglets were fed a standard sow milk replacer and thereafter piglets were randomly assigned to one of two intervention diets for 20 days. The nitrogen content of the intervention diets was comprised of both protein (70% of total) and free amino acids (30% of total), but had a different amino acid profile, resulting in:

1) Control formula with a non-adjusted amino acid composition (4.1 g/100 ml; n=18);
2) Optimised formula with an optimised amino acid composition based on the results described in the earlier examples, including optimised amounts of phenylalanine (4.1 g/100 ml; n=18).

The composition of each diet is shown in Table 2. All diets were iso-caloric, providing approximately 65 kcal/100 ml. During the study period the milk intake was adjusted every second day according to the bodyweight of the piglets. The feed intake of the piglets was restricted and standardised between treatments by providing a similar volume (ml/kg) to piglets in all treatment groups.

TABLE 2

Macronutrient and essential amino acid composition of the piglet diets

| Amount per litre | Diet 1 | Diet 2 |
|---|---|---|
| Carbohydrate (g) | 98.8 | 96.9 |
| Protein (g) | 41 | 40.8 |
| Fat (g) | 58 | 58 |
| Dry matter (g) | 18.8 | 18.8 |
| Energy (kJ) | 2745 | 2735 |
| Essential amino acids (g). Values in brackets in g/100 g protein. | | |
| Alanine | 2.57 | 1.97 |
| Arginine | 1.01 | 1.17 |
| Aspartic acid | 4.32 | 4.46 |
| Cyst(e)ine | 0.72 | 1.19 |
| Glutamic acid | 7.37 | 7.71 |
| Glycine | 0.57 | 0.69 |
| Histidine | 1.10 | 1.01 |
| Isoleucine | 2.06 | 2.79 |
| Leucine | 4.12 | 3.23 |
| Lysine | 3.11 | 2.47 |
| Methionine | 1.01 | 0.92 |
| Phenylalanine | 2.10 [5.1] | 1.42 [3.5] |
| Proline | 2.98 | 3.18 |
| Serine | 1.38 | 1.37 |
| Threonine | 2.04 [5.0] | 1.49 [3.7] |
| Tryptophan | 0.66 [1.6] | 0.43 [1.1] |
| Tyrosine | 1.56 | 2.27 |
| Valine | 2.30 | 3.04 |
| Phe:(Ile + Leu + Val + Trp + Tyr + Met) | 0.180 | 0.112 |
| Trp:(Ile + Leu + Val + Phe + Tyr + Met) | 0.050 | 0.031 |
| Phe:Thr | 1.03 | 0.95 |

Figure 5:
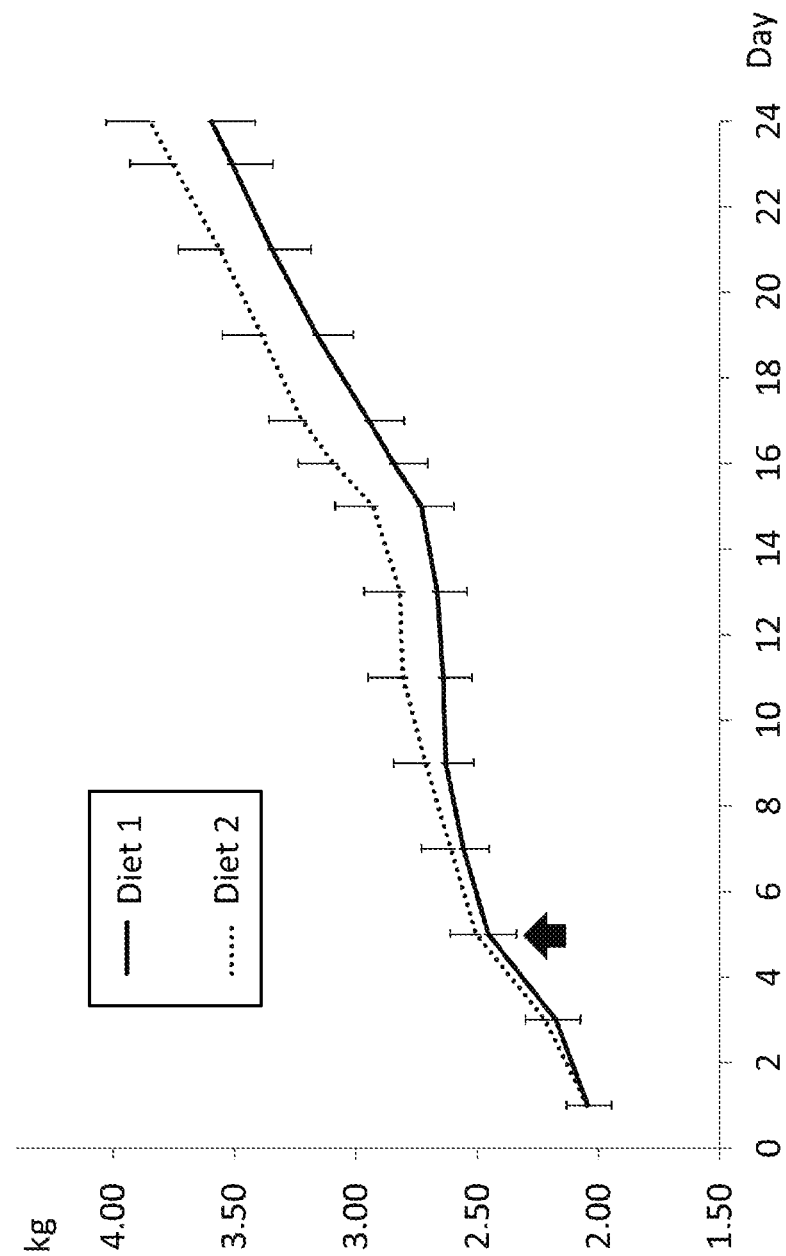
FIG. 5 shows the weight gain results of the piglet study described in Example 2, where piglets were fed one of two diets: diet 1 was a control formula without amino acid adjustment (n=18); and diet 2 was a formula with an optimised amino acid composition, containing optimized amounts of Phe, Trp and Thr and optimized ratios of Phe and Trp over the large neutral amino acids as defined herein (n=18). The arrow indicates the start of the intervention diets.

The weight gain results are presented in FIG. 5, where th. It can be seen that the growth rate for the piglets fed diet 1 was less than the growth rate for the piglets fed diet 2.

A key finding from this study was that the weight gain of the piglets on the optimised essential amino acid diet (diet 2) was greater compared to the piglets on the control diet 1, and it is noted that the protein levels of the two diets were the same but the amino acid compositions differed.

It should also be noted that the ratio of essential amino acids to non-essential amino acids in diet 2 was approximately 50:50 which is similar to that in diet 1, and also in line with the typical ratio of essential amino acids in human breast milk and commercially available formulas. Therefore, it is emphasised that diet 2 did not simply involve a lowering of the total essential amino acid levels relative to the non-essential amino acid levels in order to reduce the total level of protein.

These results therefore suggest that the new optimised essential amino acid composition with reduced amounts of phenylalanine allows for higher weight gain compared with a composition containing the same amount of total protein and a non-adjusted essential amino acid composition. Furthermore, these findings cannot be explained by a relative increase of the essential amino acids (because the ratio of essential amino acids to non-essential amino acids in both diets was approximately 50:50) but by a change in the ratio of all essential amino acids.

As such, using the new optimised amino acid composition may allow for effective lowering of protein levels in infant formula while supporting an adequate growth and development.

Example 4: Clinical Trials

An infant formula composition intended for feeding term infants, in particular in order to achieve balanced growth and/or development, having an essential amino acid composition as shown in Table 3 is prepared. Only whey and casein are used as protein sources, with whey as predominant source. It is expected that the results of clinical trials will be in agreement with the results presented supra.

TABLE 3

Macronutrient and essential amino acid composition of formula for clinical trial.

| Amino Acid | per 100 mL formula | per 100 g powder |
|---|---|---|
| Carbohydrate (g) | 7.7 | 56 |
| Protein (g) | 1.1 | 8.2 |
| Fat (g) | 3.4 | 24.8 |
| Dietary fiber (g) | 0.8 | 4.1 |
| Energy (kJ) | 280 | 2040 |
| Essential amino acids | | |
| Cyst(e)ine (mg) | 35.2 | 3.1 |
| Histidine (mg) | 29.7 | 2.7 |
| Isoleucine (mg) | 77.0 | 6.9 |
| Leucine (mg) | 102.3 | 9.1 |
| Lysine (mg) | 95.7 | 8.5 |
| Methionine (mg) | 27.5 | 2.5 |
| Phenylalanine (mg) | 42.5 | 3.8 |
| Threonine (mg) | 49.5 | 4.4 |
| Tryptophan (mg) | 11.0 | 1.1 |
| Tyrosine (mg) | 76.0 | 6.8 |
| Valine (mg) | 80.3 | 7.2 |
| Phe:(Ile + Leu + Val + Trp + Tyr + Met) | 0.11 | |
| Trp:(Ile + Leu + Val + Phe + Tyr + Met) | 0.027 | |
| Phe:Thr | 0.86 | |
| Phe + Tyr (mg/100 mL) | 118.5 | |

REFERENCES

1. Boehm G., Cervantes H., Georgi G., Jelinek J., Sawatzki G., Wermuth B., Colombo J. P., "Effect of increasing dietary threonine intakes on amino acid metabolism of the central nervous system and peripheral tissues in growing rats." *Pediatr Res* 1998 December: 44(6); 900-6.
2. Cansev, M. Wurtman, R. J., *Handbook of Neurochemistry and Molecular Neurobiology*, 2007, pp 59-97.
3. Castagné V., Moënnoz D., Finot P. A., Maire J. C., "Effects of diet-induced hyperthreoninemia. I). Amino acid levels in the central nervous system and peripheral tissues." *Life Sci* 1993: 53(24); 1803-10.
4. Darling, P. B. et al., "Threonine kinetics in preterm infants fed their mothers' milk or formula with various ratios of whey to casein" *Am J Clin Nutr* 1999 January: 69(1); 105-114.
5. Dewey et al., "Growth of breastfed and formula-fed infants from 0 to 18 months." *Pediatrics* 1992: 89; 1035-1041.
6. Dewey, K. G., "Growth characteristics of breast-fed compared to formula-fed infants." *Biol Neonate* 1998: 74(2); 94-105.
7. Dörner G., Bewer G., Lubs H., "Changes of the plasma tryptophan to neutral amino acids ratio in formula-fed infants:possible effects on brain development" *Exp Clin Endocrinol* 1983 November: 82(3); 368-71.
8. Fomon S. J., et al., "Infant formula with protein-energy ratio of 1.7 g/100 kcal is adequate but may not be safe." *J Pediatr Gastroenterol Nutr* 1999: 28(5); 495-501.
9. Gale, C. et al., "Effect of breastfeeding compared with formula feeding on infant body composition: a systematic review and meta-analysis." *Am J Clin Nutr* 2012: 95(3); 656-69.
10. Günther A. L., Buyken A. E., Kroke A., "Protein intake during the period of complementary feeding and early childhood and the association with body mass index and percentage body fat at 7 y of age." *Am J Clin Nutr* 2007 June: 85(6); 1626-33.
11. Hayasaka S., Hara S., Mizuno K., Narisawa K., Tada K., "Leber's congenital amaurosis associated with hyperthreoninemia" *Am J Opthamol* 1986: 101; 475-479.
12. Heine W., Radke M., Wutzke K. D., Peters E., Kundt G., "α-Lactalbumin-enriched low-protein infant formulas: a comparison to breast milk feeding" *Acta Pediatr* 1996: 85; 1024-1028.
13. Heine W. E., "The significance of tryptophan in infant nutrition" *Adv Exp Med Biol* 1999: 467; 705-10.
14. Heinig, M. J. et al., "Energy and protein intakes of breast-fed and formula-fed infants during the first year of life and their association with growth velocity: the DARLING Study." *Am J Clin Nutr* 1993: 58(2); 152-61.
15. Koletzko, B. et al., "Global Standards for the Composition of Infant Formula: Recommendations of an ESPGHAN Coordinated International Expert Group" *JPGN* 2005 November: 41; 584-599.
16. Koletzko, B. et al., "Lower protein in infant formula is associated with lower weight up to age 2 y: a randomized clinical trial" *Am J Clin Nutr* 2009: 89; 1-10.
17. Koopmans S. J., Ruis M., Dekker R., Korte M., "Surplus dietary tryptophan inhibits stress hormone kinetics and induces insulin resistance in pigs." *Physiol Behav* 2009 Oct. 19: 98(4); 402-410.
18. Lien E. L., "Infant formulas with increased concentrations of alpha-lactalbumin." *Am J Clin Nutr* 2003 June: 77(6); 1555S-1558S.
19. Metges, C. C. et al., "Kinetics of L-[1-(13)C]leucine when ingested with free amino acids, unlabeled or intrinsically labeled casein" *Am J Physiol Endocrinol Metab* 2000: 278(6); E1000-9.
20.
21. Reddi O. S., "Threoninemia. A new metabolic defect" *J. Pediatr* 1978: 93; 814-816.
22. Riccio, O., Jacobshagen M., Golding B., Vutskits L., Jabaudon D., Hornung J. P., Dayer A. G., "Excess of serotonin affects neocortical pyramidal neuron migration." *Transl Psychiatry* 2011 Oct. 11: 1; e47, doi: 10.1038/tp.2011.49.
23. Riedijk M. A., Voortman G., van Goudoever J. B., "Use of [13C]bicarbonate for metabolic studies in preterm infants: intragastric versus intravenous administration." *Pediatr Res* 2005: 58; 861-4.
24. Rigo J., Boehm G., Georgi G., Jelinek J., Nyambugabo K., Sawatzki G., Studzinski F., "An Infant Formula Free of Glycomacropeptide Prevents Hyperthreoninemia in Formula-Fed Preterm Infants" *JPGN* 2001: 32; 127-130.
25. Sandström O., Lönnerdal B., Graverholt G., Hernell O., "Effects of alpha-lactalbumin-enriched formula containing different concentrations of glycomacropeptide on infant nutrition." *Am J Clin Nutr* 2008 April: 87(4); 921-8.
26. Shaw, V. and Lawson, M. Paediatric Dietetics 2001, 2nd ed. Oxford: Blackwell Science.

27. Trabulsi J., Capeding R., Lebumfacil J., Ramanujam K., Feng P., McSweeney S., Harris B., DeRusso P., "Effect of an α-lactalbumin-enriched infant formula with lower protein on growth." *Eur J Clin Nutr* 2011 February: 65(2); 167-74.
28. van der Schoor, S. R. et al., "Validation of the direct nasopharyngeal sampling method for collection of expired air in preterm neonates." *Pediatr Res* 2004: 55(1); 50-54.
29. van Goudoever J. B., Sulkers E. J., Chapman T. E., et al. "Glucose kinetics and glucoregulatory hormone levels in ventilated preterm infants on the first day of life." *Pediatr Res* 1993: 33; 583-9.
30. Viadel, B., et al., "Amino acid profile of milk-based infant formulas." *Int J Food Sci Nutr* 2000: 51(5); 367-72.
31. WHO MULTICENTRE GROWTH REFERENCE STUDY GROUP "WHO Child Growth Standards based on length/height, weight and age" *Acta Paediatrica* 2006: Suppl 450; 76-85.
32. WHO/FAO/UNU, Protein and amino acid requirements in human nutrition. WHO Technical Report Series, 2007 (935): p. 1-265.
33. Zello, G. A. et al., "Dietary lysine requirement of young adult males determined by oxidation of 1-[1-13C]phenylalanine" *Am J Physiol Endocrinol Metab* 1993: 264; E677-E685.

In this document and in its claims, the verb "to comprise" and its conjugations is used in its non-limiting sense to mean that items following the word are included, but items not specifically mentioned are not excluded. In addition, reference to an element by the indefinite article "a" or "an" does not exclude the possibility that more than one of the element is present, unless the context clearly requires that there be one and only one of the elements. The indefinite article "a" or "an" thus usually means "at least one".

Each of the applications and patents mentioned in this document, and each document cited or referenced in each of the above applications and patents, including during the prosecution of each of the applications and patents ("application cited documents") and any manufacturer's instructions or catalogues for any products cited or mentioned in each of the applications and patents and in any of the application cited documents, are hereby incorporated herein by reference. Furthermore, all documents cited in this text, and all documents cited or referenced in documents cited in this text, and any manufacturer's instructions or catalogues for any products cited or mentioned in this text, are hereby incorporated herein by reference.

Various modifications and variations of the described methods and system of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention which are obvious to those skilled in molecular biology or related fields are intended to be within the scope of the claims.

The invention claimed is:

1. A method for (a) promoting, assisting or achieving balanced growth or development in an infant, and/or (b) preventing or reducing the risk of obesity later in life in an infant and/or (c) preventing or reducing the risk of unbalanced growth or development in an infant, said method comprising administering to said infant a formula comprising
    (a) 3.0-3.9 g phenylalanine per 100 g protein; and
    (b) 39-46 mg phenylalanine per 100 ml, and having a weight ratio of phenylalanine to the sum of isoleucine, leucine, valine, tryptophan, tyrosine, and methionine of from 1:7.237 (0.138) to 1:10.810 (0.0925);
    (c) 5.0-7.8 g isoleucine per 100 g protein, 6.6-10.4 g leucine per 100 g protein, 0.7-1.1 g tryptophan per 100 g protein, 5.0-7.8 g tyrosine per 100 g protein, 5.2-8.1 g valine per 100 g protein, 1.8-2.8 g methionine per 100 g protein;
    (d) optionally 3.2-5.0 g threonine per 100 g protein, and
    (e) between 5 and 50 en % lipid, between 5 and 50 en % protein, between 15 and 90 en % carbohydrate,
wherein the infant formula comprises a protein level of 0.9 to 1.4 g of protein per 100 mL of infant formula
wherein the infant formula further comprises galacto-oligosaccharides and/or fructo-oligosaccharides.

2. The method according to claim 1, wherein the infant is a term infant.

3. A method for promoting, assisting or achieving balanced growth or development of the brain of an infant and/or the cognitive function of an infant, the method comprising administering to the infant an infant formula, comprising:
    (a) 3.0-3.9 g phenylalanine per 100 g protein; and
    (b) 39-46 mg phenylalanine per 100 ml, and having a weight ratio of phenylalanine to the sum of isoleucine, leucine, valine, tryptophan, tyrosine, and methionine of from 1:7.237 (0.138) to 1:10.810 (0.0925);
    (c) 5.0-7.8 g isoleucine per 100 g protein, 6.6-10.4 g leucine per 100 g protein, 0.7-1.1 g tryptophan per 100 g protein, 5.0-7.8 g tyrosine per 100 g protein, 5.2-8.1 g valine per 100 g protein, 1.8-2.8 g methionine per 100 g protein;
    (d) optionally 3.2-5.0 g threonine per 100 g protein, and
    (e) between 5 and 50 en % lipid, between 5 and 50 en % protein, between 15 and 90 en % carbohydrate,
wherein the infant formula comprises a protein level of: 0.9 to 1.4 g of protein per 100 mL of infant formula,
wherein the infant formula further comprises galacto-oligosaccharides and/or fructo-oligosaccharides.

4. A method for promoting, assisting or achieving balanced growth or development of the body of an infant and/or the infant's body composition, said method comprising administering to said infant a formula comprising:
    (a) 3.0-3.9 g phenylalanine per 100 g protein,
    (b) 39-46 mg phenylalanine per 100 ml, and having a weight ratio of phenylalanine to the sum of isoleucine, leucine, valine, tryptophan, tyrosine, and methionine of from 1:7.237 (0.138) to 1:10.810 (0.0925),
    (c) 5.0-7.8 g isoleucine per 100 g protein, 6.6-10.4 g leucine per 100 g protein, 0.7-1.1 g tryptophan per 100 g protein, 5.0-7.8 g tyrosine per 100 g protein, 5.2-8.1 g valine per 100 g protein, 1.8-2.8 g methionine per 100 g protein,
    (d) optionally, 3.2-5.0 g threonine per 100 g protein, and
    (e) between 5 and 50 en % lipid, between 5 and 50 en % protein, between 15 and 90 en % carbohydrate;
wherein the infant formula comprises a protein level of 0.9 to 1.4 g of protein per 100 mL of infant formula; and
wherein the infant formula further comprises galacto-oligosaccharides and/or fructo-oligosaccharides.

* * * * *